US006590897B1

(12) United States Patent
Lauffenburger et al.

(10) Patent No.: US 6,590,897 B1
(45) Date of Patent: Jul. 8, 2003

(54) SYSTEM AND METHOD FOR BRIDGING UNIVERSAL SERIAL BUS AND ASYNCHRONOUS TRANSFER MODE COMMUNICATION LINKS

(75) Inventors: Kenneth A. Lauffenburger, Carrollton, TX (US); Kimberly I. Martin, Rockwall, TX (US); Klaus S. Fosmark, Plano, TX (US); William A. Perry, Jr., Addison, TX (US)

(73) Assignee: Efficient Networks, Inc., Dallas, TX (US)

( * ) Notice: Subject to any disclaimer, the term of this patent is extended or adjusted under 35 U.S.C. 154(b) by 0 days.

(21) Appl. No.: 09/264,430

(22) Filed: Mar. 8, 1999

(51) Int. Cl.⁷ ............................................. H04L 12/56
(52) U.S. Cl. .................................. 370/395.6; 370/466
(58) Field of Search .......................... 370/395.6, 395.3, 370/401, 466, 468

(56) References Cited

U.S. PATENT DOCUMENTS

| | | | |
|---|---|---|---|
| 5,231,631 A | 7/1993 | Buhrke et al. ............... | 370/230 |
| 5,274,768 A | 12/1993 | Traw et al. .................. | 370/397 |
| 5,280,476 A | 1/1994 | Kojima et al. ............... | 370/397 |
| 5,311,509 A | 5/1994 | Heddes et al. .............. | 370/397 |
| 5,379,297 A | 1/1995 | Glover et al. ............... | 370/355 |
| 5,381,411 A | 1/1995 | Ohno et al. .................. | 370/398 |
| 5,414,707 A | 5/1995 | Johnston et al. ......... | 370/395.6 |
| 5,420,858 A | 5/1995 | Marshall et al. ........ | 370/395.53 |
| 5,430,721 A | 7/1995 | Dumas et al. ......... | 370/395.41 |
| 5,455,826 A | 10/1995 | Ozveren et al. ............. | 370/232 |
| 5,490,141 A | 2/1996 | Lai et al. ..................... | 370/352 |
| 5,535,197 A | 7/1996 | Cotton .................. | 370/395.72 |

(List continued on next page.)

FOREIGN PATENT DOCUMENTS

| | | | |
|---|---|---|---|
| EP | 0130260 | 1/1985 | |
| EP | 0325794 | 12/1988 | |
| WO | 9807282 | 4/1998 | |
| WO | WO 98/53634 | 11/1998 | ........... H04Q/11/00 |

OTHER PUBLICATIONS

The Internet Protocol Journal, vol. 1, No. 3, pp. 13–26, "Residential Area CATV Brodaband Internet Technology: Current Status", by Mark Laubach.*
"Traffic Management Specification Version 4.0" (af–tm–0056.000), *The ATM Forum Technical Committee*, Apr. 1996, 107 pages.
"Universal Serial Bus Class Definitions for Communication Devices, " Version 1.1, *USB Implementers' Forum*, Jan. 19, 1999, 110 pp.
"ATM over ADSL Recommendations," *ADSL Forum Technical Report TR–002*, Mar 1997, 23 pages.
"Framing and Encapulations Standards for ADSL: Packet Mode," *ADSL Forum WT–004 v3.0 Technical Report*, Mar. 1997, 16 pages.
Daniel Minoli and Micheal Vitella, "ATM Cell Relay Service for Corporate Environments," *New York: McGraw–Hill, Inc.,* 1994.

Primary Examiner—Salvatore Cangialosi
(74) Attorney, Agent, or Firm—Baker Botts L.L.P.

(57) ABSTRACT

A modem operable to facilitate communication between a host and a communications link includes a memory operable to store a rate control algorithm. The modem further comprises a controller operable to receive from the universal serial bus a first USB segment comprising a first plurality of ATM cells and rate control information associated with the first plurality of ATM cells, to store the first plurality of ATM cells in the memory, to perform the rate control algorithm on the first plurality of ATM cells using the rate control information received in the first USB segment, and to transmit each of the plurality of ATM cells at a particular transmission rate according to the results of the rate control algorithm.

51 Claims, 9 Drawing Sheets

U.S. PATENT DOCUMENTS

| | | |
|---|---|---|
| 5,548,587 A | 8/1996 | Bailey et al. ............... 370/60.1 |
| 5,557,607 A | 9/1996 | Holden ....................... 370/413 |
| 5,568,486 A | 10/1996 | Huscroft et al. ......... 370/395.2 |
| 5,572,522 A | 11/1996 | Calamvokis et al. ....... 370/390 |
| 5,583,861 A | 12/1996 | Holden .................. 370/395.42 |
| 5,592,476 A | 1/1997 | Calamvokis et al. ....... 370/390 |
| 5,600,650 A | 2/1997 | Oskouy ....................... 370/468 |
| 5,602,853 A | 2/1997 | Ben-Michael et al. ...... 370/474 |
| 5,617,416 A | 4/1997 | Damien ....................... 370/391 |
| 5,625,625 A | 4/1997 | Oskouy et al. ............. 370/395 |
| 5,629,937 A | 5/1997 | Hayter et al. ............... 370/233 |
| 5,701,292 A | 12/1997 | Chiussi et al. ............... 370/232 |
| 5,726,985 A | 3/1998 | Daniel et al. ................ 370/382 |
| 5,742,765 A | 4/1998 | Wong et al. ................. 370/465 |
| 5,745,477 A | 4/1998 | Zeng et al. .................. 370/230 |
| 5,751,709 A | 5/1998 | Rathnavelu .................. 370/395 |
| 5,852,655 A | 12/1998 | McHale et al. .......... 379/93.14 |
| 5,905,727 A * | 5/1999 | Christenses et al. ..... 370/395.3 |
| 6,021,129 A | 2/2000 | Martin et al. ................ 370/395 |
| 6,081,533 A | 6/2000 | Laubach et al. ............. 370/421 |
| 6,084,880 A | 7/2000 | Bailey et al. ................ 370/395 |
| 6,137,779 A * | 10/2000 | Miller et al. ................ 370/236 |

\* cited by examiner

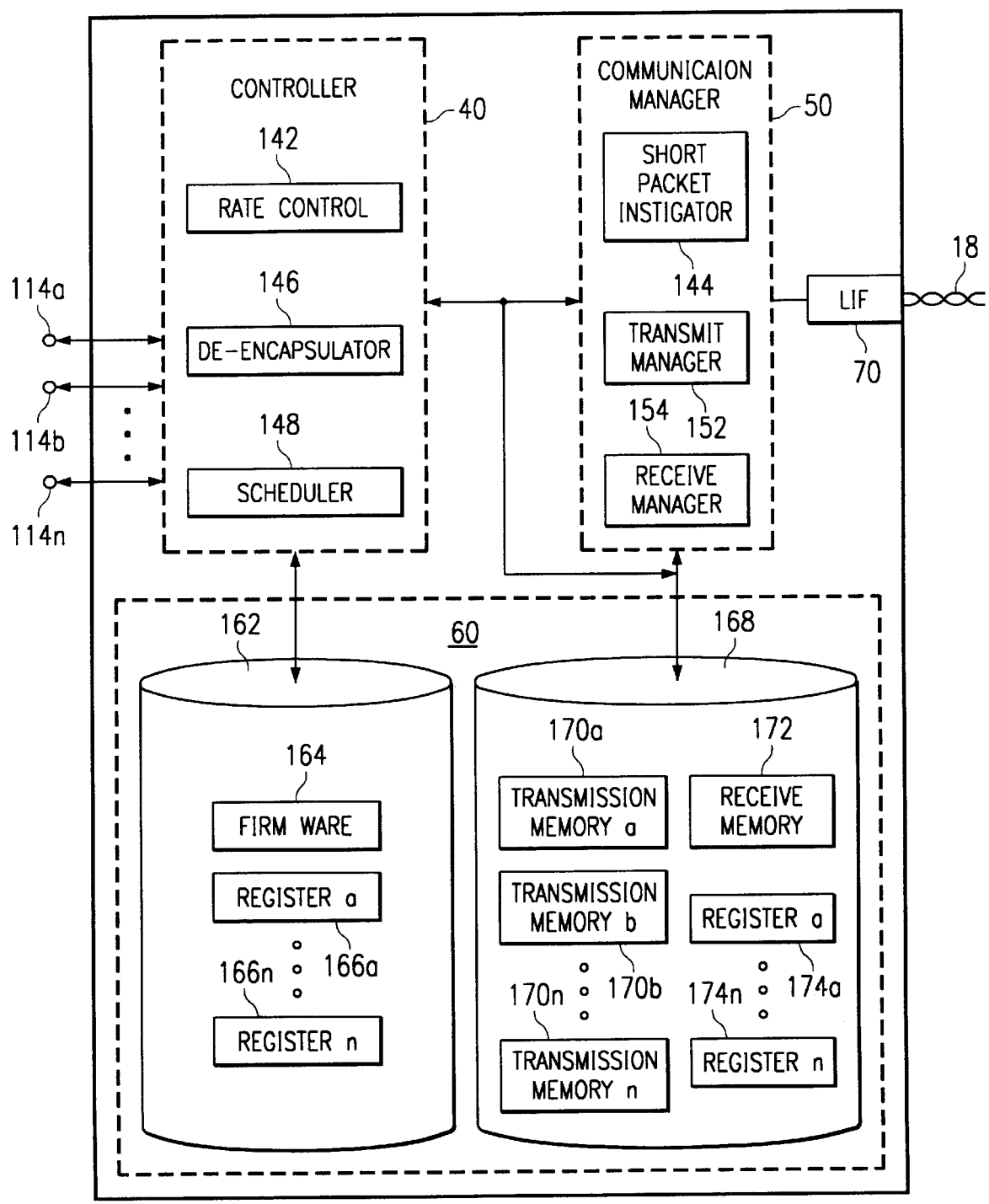

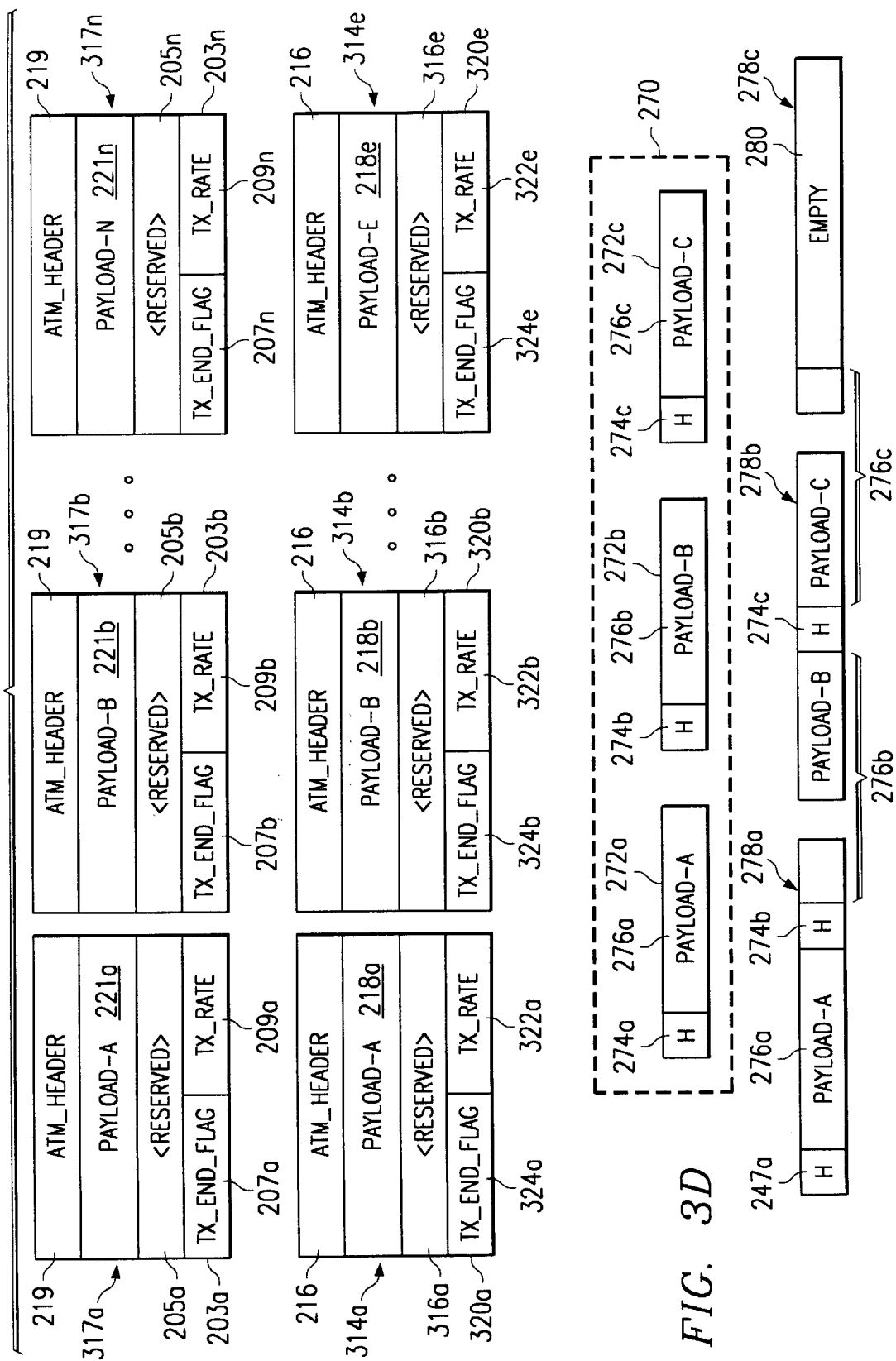

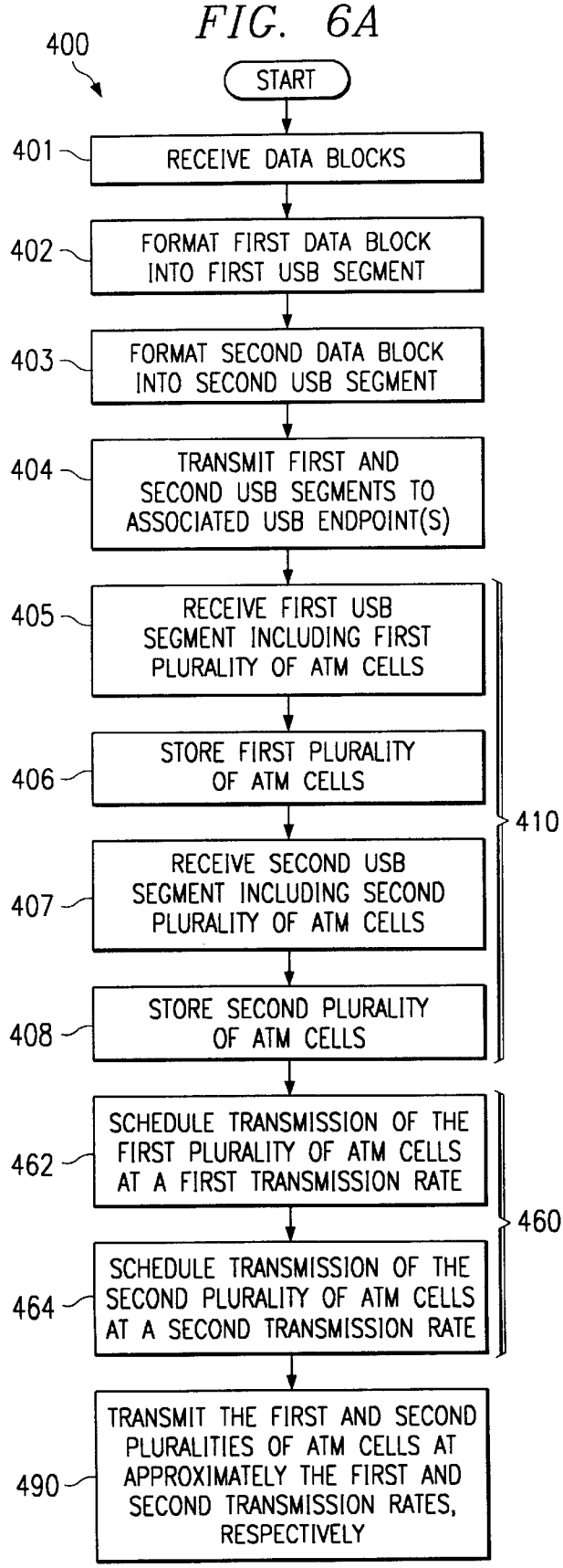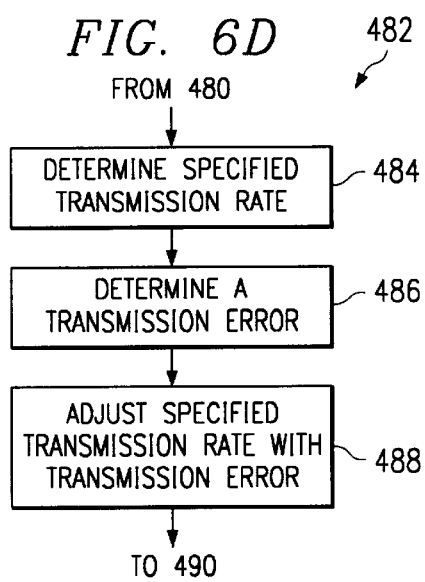

SYSTEM AND METHOD FOR BRIDGING UNIVERSAL SERIAL BUS AND ASYNCHRONOUS TRANSFER MODE COMMUNICATION LINKS

CROSS-REFERENCE TO RELATED APPLICATIONS

This application is related to U.S. application Ser. No. 09/265,144, entitled "System and Method for Communicating Information from a Communications Link to a Host Using a Universal Serial Bus," which was filed contemporaneously with this application now U.S. Pat. No. 6,021,129. These applications have been commonly assigned to Efficient Networks, Inc.

TECHNICAL FIELD OF THE INVENTION

The present invention relates to the field of communication systems, and more particularly to a system and method for communicating information between a host and a communications network using a universal serial bus and a modem.

BACKGROUND OF THE INVENTION

The advent of the universal serial bus (USB) has provided significant advancements in a host's ability to communicate with peripheral equipment in a timely and efficient manner. When used in conjunction with asynchronous transfer mode (ATM) technology, however, the universal serial bus presents unique challenges that, until now, have gone largely unaddressed. As used throughout this document, the terms "asynchronous transfer mode" and "ATM" refer to a fixed-length cell based communication technology. As used throughout this document, the terms "universal serial bus" and "USB" refer to a packet-based master-slave communications device operable to facilitate communications between a host and peripheral devices.

One issue involved in transmitting ATM cells over a universal serial bus is how to provide effective control of the transmission rate associated with each class of ATM cell, and the multiple transmission rates associated with various classes of service. Conventional approaches rely on a driver at the host to provide virtually all rate control functionality. This approach suffers from several problems. One problem with relying on the host to provide rate control is that it places an unnecessary, and often heavy burden on the host, rendering the host unable to attend to other processing tasks. Another problem with this approach is that hosts typically utilize operating systems that lack the capability to provide the necessary granularity in rate control. Still another problem with this approach is that even if the host's operating system could provide a high level of granularity in rate control, the accuracy gained in the rate control algorithm would be lost when the ATM cells are transmitted across the universal serial bus, which typically has a one millisecond frame rate.

A recent universal serial bus specification suggests that it may be possible to provide some level of rate control functionality at the modem. This specification, however, requires that prior to performing rate control functions, the modem be configured to perform rate control functions for a particular transmission rate. The specification requires that the modem be configured by sending a separate stream of control information to the modem. Using this approach, each time it is desired that the modem perform rate control using a different transmission rate, the modem must be reconfigured for the new transmission rate. This approach wastes memory and suffers from latency caused by having to continuously reconfigure the modem for different transmission rates.

Still another issue in transmitting ATM cells over a universal serial bus is how to format conventional ATM cells (which are typically 52 or 53 bytes) into universal serial bus transmission packets (which are typically 64-byte packets). One approach has been to simply insert one ATM cell into each USB packet, leaving the remainder of the USB packet empty. This approach wastes valuable bandwidth. Another approach has been to concatenate ATM signals from a common protocol data unit into a segment of USB packets. Although this approach may, at times, make more efficient use of the universal serial bus' bandwidth, it lacks efficiency when compared to the present invention.

Another issue in transmitting ATM cells over a universal serial bus is how to achieve effective flow control. The flow control functionality offered by the universal serial bus wastes bandwidth and is generally considered poor. Higher protocol levels, such as the transmission control protocol (TCP) level offer much better flow control. These higher level flow control mechanisms, however, give way to the USB flow control mechanism whenever the memory structure in the modem fills up.

Because conventional systems for transmitting ATM cells over a universal serial bus perform all rate control and scheduling at the host, memory and processing requirements at the host are significant. To offset costs associated with larger memories and processors used to perform rate control and scheduling at the host, conventional systems find it desirable to use the least amount of memory possible at the modem. These small modem memories, however, fill quickly and trigger the poor USB flow control mechanism, wasting valuable bandwidth.

In addition, conventional systems rarely pay much attention to flow control mechanisms of the universal serial bus, choosing instead to rely on the rate control and scheduling functions performed at the host to ensure efficient data transmission. Due to various transmission conditions, however, signal backlogs occur and flow control nevertheless becomes an issue, even where rate control and scheduling are effected at the host. Again, the universal serial bus flow control mechanism is triggered and bandwidth is wasted.

SUMMARY OF THE INVENTION

In accordance with the present invention, a system and method for communicating information from a host to a communications link using a universal serial bus are provided that substantially reduce or eliminate shortcomings associated with prior approaches.

In one aspect of the present invention, a system for communicating information between a host and a communications link using a universal serial bus, comprises a driver at the host operable to receive a data block comprising a plurality of ATM cell payloads, to format the data block into a first USB segment including rate control information associated with the plurality of ATM payloads, and to communicate the first USB segment to the universal serial bus. The system further comprises a modem operable to receive the first USB segment from the universal serial bus, to store the ATM cell payloads in a modem memory, and to schedule transmission of the ATM cell payloads at a particular transmission rate using the rate control information.

In another aspect of the present invention, a modem operable to facilitate communication between a host and a communications link comprises a memory operable to store a rate control algorithm. The modem further comprises a controller operable to receive from the universal serial bus a first USB segment comprising a first plurality of ATM cells and rate control information associated with the first plurality of ATM cells, to store the first plurality of ATM cells in the memory, and to perform the rate control algorithm on the first plurality of ATM cells using the rate control information received in the first USB segment. The modem further operable to transmit each of the plurality of ATM cells at a particular transmission rate according to the results of the rate control algorithm.

In yet another aspect of the present invention, a method of communicating information from a host to a communications link using a universal serial bus comprises receiving at a host, a data block comprising a plurality of ATM cell payloads, formatting the data block at the host into a USB segment including rate control information associated with the plurality of ATM payloads, and communicating the USB segment over the universal serial bus. The method further comprises receiving at a modem the USB segment from the universal serial bus, storing the ATM cell payloads in a modem memory, and scheduling transmission of the ATM cell payloads at a particular transmission rate using the rate control information.

In still another aspect of the invention, a method of communicating information between a host and a communications link using a universal serial bus comprises receiving from the universal serial bus a first plurality of ATM cells associated with a first transmission channel of the communications link, and receiving from the universal serial bus a second plurality of ATM cells associated with a second transmission channel of the communications link. The method further includes storing the first plurality of ATM cells in a first transmission memory, storing the second plurality of ATM cells in a second transmission memory, and determining at the modem a transmission order for the cells of the first and second pluralities of ATM cells.

Technical advantages of the present invention include the provision of a system and method operable to facilitate communication between a host and a communications link using a universal serial bus. The present invention provides a further advantage of implementing segmentation functions at the host, while performing rate control and scheduling functions at the modem. Through this arrangement, the present invention performs each function at a location best suited to provide that function, increasing efficiency and accuracy of the information transfer.

Rather than relying on the host to provide all rate control and scheduling functionality, the present invention provides rate control and scheduling functionality at the modem. By performing at least a portion of the scheduling and/or rate control algorithms at the modem, the invention eases the processing load on the host, freeing the host to attend to other tasks. In addition, performing rate control at the modem provides far more accurate control than systems relying on the host to provide all or the majority of this functionality. This is particularly true where the host is running a WINDOWS™, or similar operating system that lacks the granularity of control provided at the modem. Furthermore, because rate control and scheduling functionality is provided at the modem after the information has passed across the universal serial bus, the accuracy of the rate control algorithm is preserved. The present invention also provides a mechanism for prioritizing transmission of one group of cells over another, which would be unavailable if rate control were performed at the host.

The invention also provides a significant advantage over previous approaches by formatting rate control information into the same universal serial bus segment that carries ATM cell payloads and ATM cell header information. By specifying rate control information "in-stream," the invention avoids the wasted memory and bandwidth problems associated with previous approaches.

The present invention provides an advantage of allowing great flexibility and efficiency in specifying a transmission rate for ATM cells being transmitted, for example, by allowing for indirect rate specification. The invention allows for specification of a rate code in each USB segment, which can be used to index a rate table including a plurality of entries. Each entry in the table corresponds to a particular transmission rate. The entries in the rate table can include an integer portion and a fractional portion of a specified rate. By trading off between the size of the integer field and the size of the fractional field, or by simply providing a wider rate table, the invention allows for specification of any range of rates, and any granularity of rates. Using a rate code to indirectly specify a transmission rate associated with each USB segment provides significant flexibility, which is unavailable in conventional direct rate specification methods.

The present invention provides a unique and effective mechanism of formatting, at the host, conventional ATM cells into USB packets. This approach optimizes the bandwidth of universal serial bus, while facilitating rate control and transmission scheduling at the modem. The present invention takes advantage of the fact that each of the ATM cells associated with a common protocol data unit shares common ATM header information. Rather than wasting bandwidth by transmitting the same ATM cell header information with each ATM cell payload, the present invention forms a USB segment by concatenating ATM cell payloads and appending the concatenated payloads to a single transmission encapsulation header. The transmission encapsulation header includes a single copy of the ATM cell header information common to each of the ATM cell payloads, and provides rate control information, which can be used by the modem to perform a rate control algorithm prior to transmitting the ATM cells. By transmitting rate control information associated with one or more cells in an encapsulation header associated with those cells, the present invention avoids the need for a complex control structure to store rate control information associated with a myriad of possible transmission scenarios. In addition, this approach avoids having to reconfigure the modem with a separate control stream for each transmission rate, thus conserving valuable bandwidth.

The invention provides a further advantage in its use of multiple universal serial bus endpoints and multiple transmission memories. By using a plurality of USB channels to transmit different segments of ATM cells, and associating each endpoint with a transmission memory, the invention reduces latency that would otherwise be involved in approaches using only a single transmission channel or a single transmission memory.

The invention also provides an effective mechanism for ensuring the availability of higher level flow control mechanisms, such as transmission control protocol flow control. By utilizing a transmission memory that is at least the size of a transmission control protocol window, the invention avoids filling the transmission memory and causing the universal serial bus flow control mechanism to take over, therefore ensuring that the transmission control protocol flow control mechanism remains available.

BRIEF DESCRIPTION OF THE DRAWINGS

For a more complete understanding of the present invention, and for further features and advantages thereof, reference is now made to the following description taken in conjunction with the accompanying drawings, in which:

FIG. 2 is a block diagram of an exemplary modem for communicating information using a universal serial bus according to the teachings of the present invention;

FIGS. 3A–3D show exemplary signals communicated according to the teachings of the present invention;

FIGS. 6A–6D are flow charts showing an exemplary method of communicating information from a host to a communications link using a universal serial bus.

DETAILED DESCRIPTION OF THE INVENTION

Figure 1:
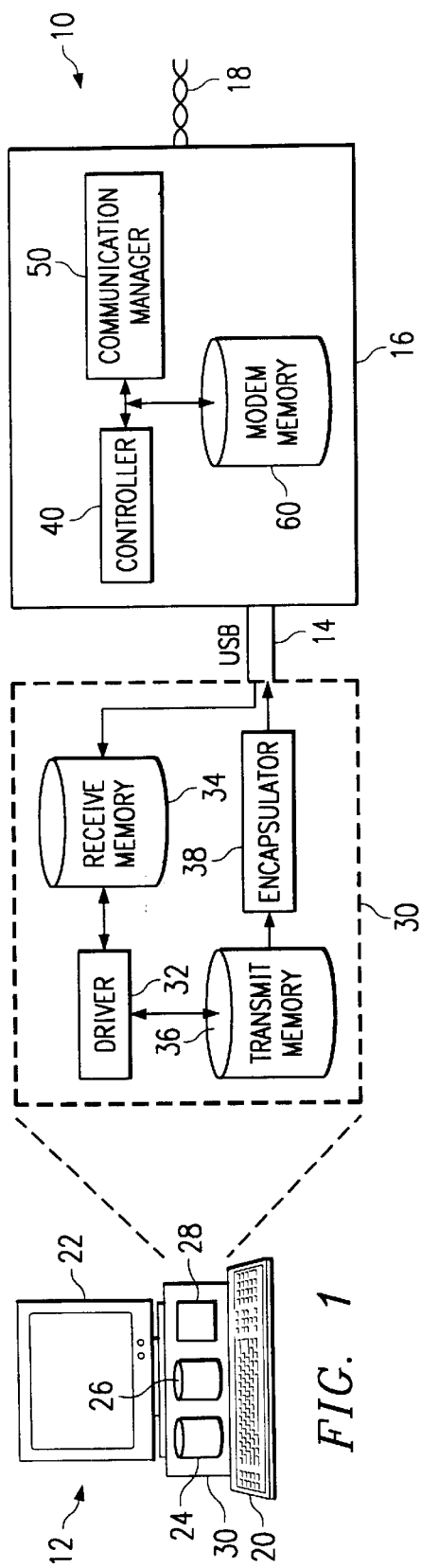
FIG. 1 is a block diagram of an exemplary system for communicating information using a universal serial bus and a modem according to the teachings of the present invention.

FIG. 1 is a block diagram of an exemplary system 10 for communicating information between a host 12 and a communications link 18 using a universal serial bus (USB) 14 and a modem 16. In general, system 10 operates to manage communication of signal packets containing fixed-length cells to and from various network elements. Throughout this document, the terms "packet," "protocol data unit," and "PDU," refer to a logical grouping of information that contains data, and that may or may not contain control information. The term "cell" refers generally to a subset of the larger signal packets.

In the illustrated embodiment, system 10 facilitates communication of asynchronous transfer mode "ATM") packets containing, for example, 52 or 53-byte ATM cells. Although this description refers to a particular implementation of ATM, the term "ATM" contemplates other later revisions, modifications, enhancements, or new types of fixed-length cell transfer techniques. In one mode of operation, modem 16 receives a plurality of burst communications from host 12 over universal serial bus 14, each burst communication including a segment of ATM cells associated with a particular transmission channel of communications link 18. Modem 16 contains intelligence allowing it to schedule transmission of each USB segment of ATM cells and provide rate control functionality to facilitate transmission of each USB segment of ATM cells at or near its associated transmission rate. In addition, modem 16 allows for transmission rate correction to account for transmission delays, and also facilitates various transmission scheduling options, such as scheduling transmission based on each cell's relative priority.

In another mode of operation, modem 16 operates to receive a plurality of ATM cells from communications link 18, and to control transmission of the ATM cells across universal serial bus 14 to host 12. System 10 provides unique and effective control mechanisms that ensure that host 12 receives the ATM cells in a timely manner, without causing host 12 to engage in an appreciable amount of buffer processing.

In the illustrated embodiment, universal serial bus 14 comprises a packet-based serial bus generally following a master-slave protocol. As used throughout this document, the terms "universal serial bus" and "USB" refer to any packet-based master-slave communications device operable to facilitate communications between a host and one or more peripheral devices. Although this description describes a particular implementation of a universal serial bus, later revisions, modifications, enhancements, or new types of packet-based master-slave bus arrangements are contemplated by the invention.

Host 12 may comprise, for example, a workstation, a mainframe computer, a miniframe computer, a desktop computer, a laptop computer, a personal digital assistant, or any other computing or communicating device. In operation, host 12 may execute with any of the well-known MS-DOS, PC-DOS, OS-2, MAC-OS, WINDOWS™, UNIX, or other appropriate operating systems. Host 12 includes an input device 20, an output device 22, random access memory ("RAM") 24, read-only memory ("ROM") 26, CD-ROM, hard drive, or other magnetic or optical storage media 28, or other appropriate volatile or nonvolatile storage and retrieval devices, and a processor 30 having a system clock or other suitable timing device or software.

Input device 20 may comprise, for example, a keyboard, mouse, graphics tablet, touch screen, pressure-sensitive pad, joystick, light pen, microphone, or other suitable input device. Output device 22 may comprise, for example, a video display, a printer, a disk drive, a plotter, a speaker, or other suitable output device.

Items within the dashed lines in FIG. 1 represent exemplary functional operation and data organization of the associated components of system 10. Host 12 includes a driver 32. Driver 32 represents any software, hardware, firmware, or combination thereof operable to manage communications to and from host 12. Host 12 also includes a receive memory 34 and a transmit memory 36. Receive memory 34 and transmit memory 36 may comprise any of a variety of data structures, arrangements or compilations operable to store and facilitate retrieval of various information stored locally at host 12. In this embodiment, receive memory 34 comprises one or more buffers that can be queued by driver 32 to temporarily store data received from universal serial bus 14. Similarly, transmit memory 36, in this embodiment, comprises one or more buffers that can be queued by driver 32 to temporarily store data to be transmitted over universal serial bus 14. Although receive memory 34 and transmit memory 36 are shown as separate functional entities, they may reside within a common memory of host 12 without departing from the scope of the invention.

Host 12 also includes an encapsulator 38, which interfaces universal serial bus 14. Encapsulator 38 facilitates formatting of data communicated over universal serial bus 14. Although the illustrated embodiment shows encapsulator 38 as a stand-alone element, its functions could alternatively be integrated into driver 32. In the illustrated embodiment, information is communicated over universal serial bus 14 in universal serial bus segments ("USB segments"), each comprising one or more universal serial bus packets ("USB packets"). Each USB segment contains payload information for one or more ATM cells along with overhead information associated with the cell payloads. Each segment holds information associated with a single protocol data unit ("PDU"), although each segment does not necessarily include an entire protocol data unit.

In this embodiment, each USB packet holds up to 64 bytes. Other sized USB packets could be used without departing from the scope of the invention. For example, system 10 may use 8, 16, or 32-byte USB packets. For purposes of this description, each ATM cell payload comprises 48 bytes of data, and is associated with 4 bytes of overhead, or ATM cell header information. Other cell capacities and configurations could alternatively be used without departing from the scope of the invention. In preparing data for transmission over universal serial bus 14, encapsulator 38 assembles individual ATM cell payloads into USB segments comprising one or more 64-byte USB packets. Encapsulator 38 may also provide the functionality to extract individual ATM cells from USB packets received from universal serial bus 14. In this embodiment, USB packets are initially stored in host buffers of receive memory 34. Encapsulator 38 may extract ATM cells from USB packets prior to their transfer to driver 32. Alternatively, this functionality could be integral to driver 32.

System 10 also includes a modem 16, which provides an interface between universal serial bus 14 and a communications link 18. As used throughout this description, the term "modem" refers to any hardware, software, firmware, or combination thereof, operable to facilitate an interface between a communications link and a host device. Throughout this description, the term "communications link" describes any suitable wireline or wireless system that supports communication between network elements using ground-based and/or space-based components. In the illustrated embodiment, communications link 18 comprises an asynchronous digital subscriber line ("ADSL"). Other types of communications links could be used without departing from the scope of the invention. For example, communications link 18 may be a public switched telephone network (PSTN), an integrated services digital network (ISDN), a local area network (LAN), a wide area network (WAN), or other communication systems or combination of communication systems at one or more locations.

Modem 16 includes a controller 40 that manages various functions within modem 16, such as, scheduling and rate control of signals being transmitted over communications link 18, and assists in the instigation of short packeting of signals being communicated to host 12. Additional details regarding each of this functions will be described later in this document.

Modem 16 also includes a communications manager ("COM. MGR") 50, which, among other functions, cooperates with controller 40 to provide various functions, such as, scheduling, rate control, and short packet instigation. Controller 40 and communications manager 50 may comprise any combination of hardware, software, and/or firmware. In this embodiment, controller 40 is implemented in firmware of modem 16, and communications manager 50 comprises an application specific integrated circuit ("ASIC"). Other implementations could be utilized without departing from the scope of this invention.

Modem 16 further includes a modem memory 60, which is accessible in whole or in part to controller 40 and/or communications manager 50. Modem memory 60 includes data structures for temporarily storing signals received from communications link 18 prior to their transmission to host 12, as well as signals received from universal serial bus 14 prior to their transmission over communications link 18. Modem memory 60 also includes one or more registers, or other storage structures, which store various information used in processing signals received by modem 16.

Modem memory 60 may comprise any combination of on-chip and/or external memory devices. For example, in the illustrated embodiment, a portion of modem memory 60 comprises an on-chip static random access memory ("SRAM") integral to communications manager 50, while another portion of modem memory 60 comprises an external SRAM (external in the sense that it is not integral to any particular chip). Other memory devices could alternatively be used without departing from the scope of this invention. For example, modem memory 60 could comprise a dynamic random access memory ("DRAM") device, or other appropriate volatile or nonvolatile storage and retrieval device, or combination of such devices. Additional details regarding the structure and content of modem memory 60 will be discussed below.

Modem 16 still further includes a line interface ("LIF") 70 (see FIG. 3D), which facilitates communications between modem 16 and communications link 18. Line interface 70 includes the appropriate hardware (e.g., network interface card, etc.) and software (e.g., multi-layer protocol support, protocol conversion, data processing, data modulation, etc.) to communicate information to and from communications link 18.

In one aspect of operation, system 10 facilitates transmission of information from host 12 to communications link 18 while maximizing available bandwidth through efficient signal packetization and accurate rate control. Driver 32 receives information desired to be transmitted over communications link 18 and formats the information to facilitate its transmission over universal serial bus 14 to modem 16. In the illustrated embodiment, driver 32 begins by receiving data blocks comprising a plurality of ATM cell payloads and determining an appropriate virtual channel to facilitate their transmission. Driver 32, in cooperation with encapsulator 38, then formats the ATM payloads into one or more USB segments comprising one or more 64-byte USB packets. USB segments originating at host 12 are transmitted across universal serial bus 14, and received by controller 40 of modem 16. In a particular embodiment, USB segments are associated with transmission channels of communications link 18. Each transmission channel may be associated with a particular USB endpoint 114 of universal serial bus 14. System 10 provides an advantage of reducing latency in communications between host 12 and modem 16 by associating various USB segments with separate USB endpoints for communication to modem 16.

Controller 40 extracts ATM cells or cell payloads from the USB segments it receives, and passes them on to communications manager 50, where they are formatted into ATM cells (if necessary) and stored in modem memory 60 where they await transmission. Controller 40 and communications manager 50 cooperate to facilitate the transmission of ATM cells stored in modem memory 60 by running scheduling and/or rate control algorithms which will be discussed below.

By performing at least a portion of the scheduling and/or rate control algorithms at modem 16, system 10 provides significant advantages over systems that rely on the host to provide this functionality. For example, performing these functions at modem 16 eases the processing load on host 12, freeing host 12 to attend to other tasks. As a further example, performing rate control at the modem provides far more accurate control than systems relying on the host to provide all or the majority of this functionality. This is particularly true where the host is running a WINDOWS™, or similar operating system that lacks the granularity of control provided at modem 16. In addition, system 10 preserves the accuracy of the rate control and scheduling algorithms by performing these functions at modem 16. This avoids losing accuracy due to the large frame rates of universal serial bus 14 and the lack of a method for prioritizing transmission of one group of ATM cells over another.

In another aspect of operation, system 10 provides a unique and effective way to ensure that important information received from communications link 18 is not unduly delayed in reaching host 12, while ensures that host is not unduly burdened with having to format and process a large number of unreasonably small data buffers. At the same time, system 10 minimizes the memory requirements of modem 16, and reduces latency in transmitting information from modem 16 to host 12.

Modem 16 receives ATM cells from communications link 18, and stores those cells in modem memory 60. In a particular embodiment, modem 16 stores all ATM cells received from communications link 18 in a single receive memory 172. By storing all ATM cells in a single receive memory 172, system 10 minimizes memory requirements of modem 16. As soon as enough information is stored in receive memory 172 to fill a USB packet, such as USB packet 212, modem 16 transmits the full USB packet 212 to host 12. Since system 10 is not required to wait until an entire protocol data unit of ATM cells are received before transmitting anything to host 12, latency is significantly reduced.

In conventional bulk mode operation, universal serial bus 14 facilitates transmission of a plurality of USB packets to host 12, where each packet is loaded to a host buffer of a specified size. Typical universal bus specifications provide that if the host receives a universal serial bus packet carrying less than its full capacity, the host buffer is terminated and its contents are immediately transferred to the host driver. This process is known as "short packeting." System 10 provides a novel and effective mechanism to dynamically determine when to short packet the current host buffer, allowing driver 32 to immediately receive the contents of the buffer. System 10 ensures that important information is not delayed in reaching driver 32, while minimizing the processing load on the operating system of host 12. Details of this functionality will be discussed further below.

FIG. 2 is a block diagram showing details of a particular embodiment of modem 16. Modem 16 receives USB segments from USB end points 114a–114n, referred to generally as USB end points 114. In a particular embodiment, modem 16 receives each USB segment in a burst communication from host 12. Each USB end point 114 is associated with a particular transmission channel or, in this particular embodiment, virtual channel. Driver 32 at host 12 determines the virtual channel to be associated with each ATM cell packet. Based on this determination, driver 32 associates each cell packet with a particular USB end point 114 corresponding to the selected virtual channel.

Universal serial bus 14 may comprise any number of channels and associated endpoints 114. In a particular embodiment, universal serial bus comprises seven USB end points 114 for transmitting information from host 12 to modem 16; and one USB end point 114 for communicating information from modem 16 to host 12.

Controller 40 of modem 16 receives incoming USB segments from USB end points 114. In the illustrated embodiment, controller 40 includes a de-encapsulator 146. De-encapsulator 146 operates to extract ATM cell header information and cell payloads from incoming USB segments and pass them to communications manager 50 for further processing. Although de-encapsulator 146 is shown as a portion of controller 40, it could alternatively be constructed as part of communications manager 50, or as a separate stand-alone entity.

Controller 40 also includes a scheduler 148. Scheduler 148 performs a scheduling algorithm to determine which ATM cell should be next in line for transmission to communications link 18. In addition, controller 40 includes a rate control module 142. Rate control module 142 cooperates with communications manager 50 to provide rate control functionality. For example, rate control module 142 may operate to modify the rate of cell transmission based on a transmission rate associated with a particular group of ATM cells, or to modify the rate to compensate for delays incurred during previous transmissions. In addition, scheduler 148 and/or rate control module 142 may account for relative transmission priorities of ATM cells associated with various transmission channels.

Controller 40 communicates with modem memory 60, and in particular external memory 162. In this embodiment, external memory 162 comprises a stand-alone static random access memory, which stores firmware 164 for controller 40. External memory 162 also stores a plurality of registers 166a–166n, which hold various information used by controller 40 in its scheduling and rate control algorithms.

Communication manager 50 of modem 16 includes a transmission manager 152 and a receive manager 154. As will be discussed below, transmission manager 152 cooperates with controller 40, and in particular rate control module 142 and scheduler 146 to schedule and control the rate of transmission of signals received from universal serial bus 14.

Receive manager 154 operates to receive a plurality of ATM cells from communications link 18 and to store the ATM cells in modem memory 60. Receive manager also operates to format the ATM cells received from communications link 18 into USB packets for transmission to host 12. Communications manager 50 also includes a short packet instigator module 144. Short packet instigator 144 examines the ATM cells received from communications link 18, and determines whether one or more termination conditions have occurred.

As used throughout this document, the term "termination condition" refers to a condition that causes modem 16 to short packet the current host buffer. For example, a termination condition may comprise a recognition that the host buffer will be full upon receipt of the next USB packet. Another termination condition may be that a packet timer measuring the time that it is taking to fill the current buffer has expired. Other termination conditions may be associated with the content of the ATM cells received. For example, modem 16 may initiate a short packet in response to identifying an ATM cell as the last ATM cell of a protocol data unit, as a resource management (RM) cell, or as an operation administration and maintenance (OAM) cell. Modem 16 may use any one or any combination of these and other termination conditions to initiate a short packet.

Communications manager 50 communicates with on-chip memory 168 of modem memory 60. In this embodiment, on-chip memory 168 comprises a static random access memory device that is integral to the chip supporting control manager 50. Although on-chip memory 168 is utilized in this particular embodiment, the invention is not so limited. On-chip memory 168 could alternatively comprise an external memory device, or an integral portion of external memory 162.

In the illustrated embodiment, on-chip memory 168 stores a plurality of transmission memories 170a–170n. In a particular embodiment, each transmission memory 170 comprises a first-in-first-out (FIFO) data structure capable of storing up to 256 53-byte cells awaiting transmission. System 10 provides an advantage of utilizing transmission memories 170 deep enough to ensure that higher level flow control, such as that provided by the transmission control protocol layer, are not rendered unavailable due to standard USB flow control mechanisms taking over. In a particular embodiment, each transmission memory 170 is at least as large as a transmission control protocol window, which is typically around 8 kilo-bytes.

In this embodiment, each 64-byte space in transmission memory 170 accommodates a 4-byte ATM cell header, 48 bytes of ATM cell payload, and a 1-byte flag area, leaving 11-bytes free for additional information, if necessary. System 10 could comprise any number of transmission memories 170. In this particular embodiment, on-chip memory 168 includes seven transmission memories 170, each corresponding to a separate one of the seven USB endpoints 114. When modem 16 receives cells from universal serial bus 14, it stores them in the transmission memory 170 associated with the USB endpoint 114 from which the cells were received.

In the illustrated embodiment, each transmission memory 170 is associated with a particular USB end point 114. In another embodiment, a plurality of transmission memories 170 could be associated with a single USB endpoint 114. In the illustrated embodiment, each transmission memory is associated with a single transmission channel of communications link 18. Driver 32 of host 12 determines an appropriate transmission channel of communications link 18 to service a segment of ATM cells, and associates that segment with a particular endpoint and, therefore, a particular transmission channel. In this particular example, on-chip memory 168 includes seven transmission memories 170, each corresponding to a separate one of the seven USB endpoints 114. When modem 16 receives a USB segment from universal serial bus 14, it stores ATM cells associated with that segment in a transmission memory 170 associated with the USB endpoint 114 from which the segment was received.

On-chip memory 168 further includes a receive memory 172. In a particular embodiment, receive memory 172 comprises a single first-in-first-out ("FIFO") data structure capable of storing 300 53-byte ATM cells. Receive memory 172 temporarily stores ATM cells received from communications link 18 pending their transmission to host 12. System 10 could comprise any number of receive memories 172. Furthermore, the configuration and capacity of each receive memory could be modified without departing from the scope of the invention.

In the illustrated embodiment, on-chip memory 168 further includes a plurality of registers 174a–174n, which store various information used in the scheduling and rate control algorithms.

Figure 3A:
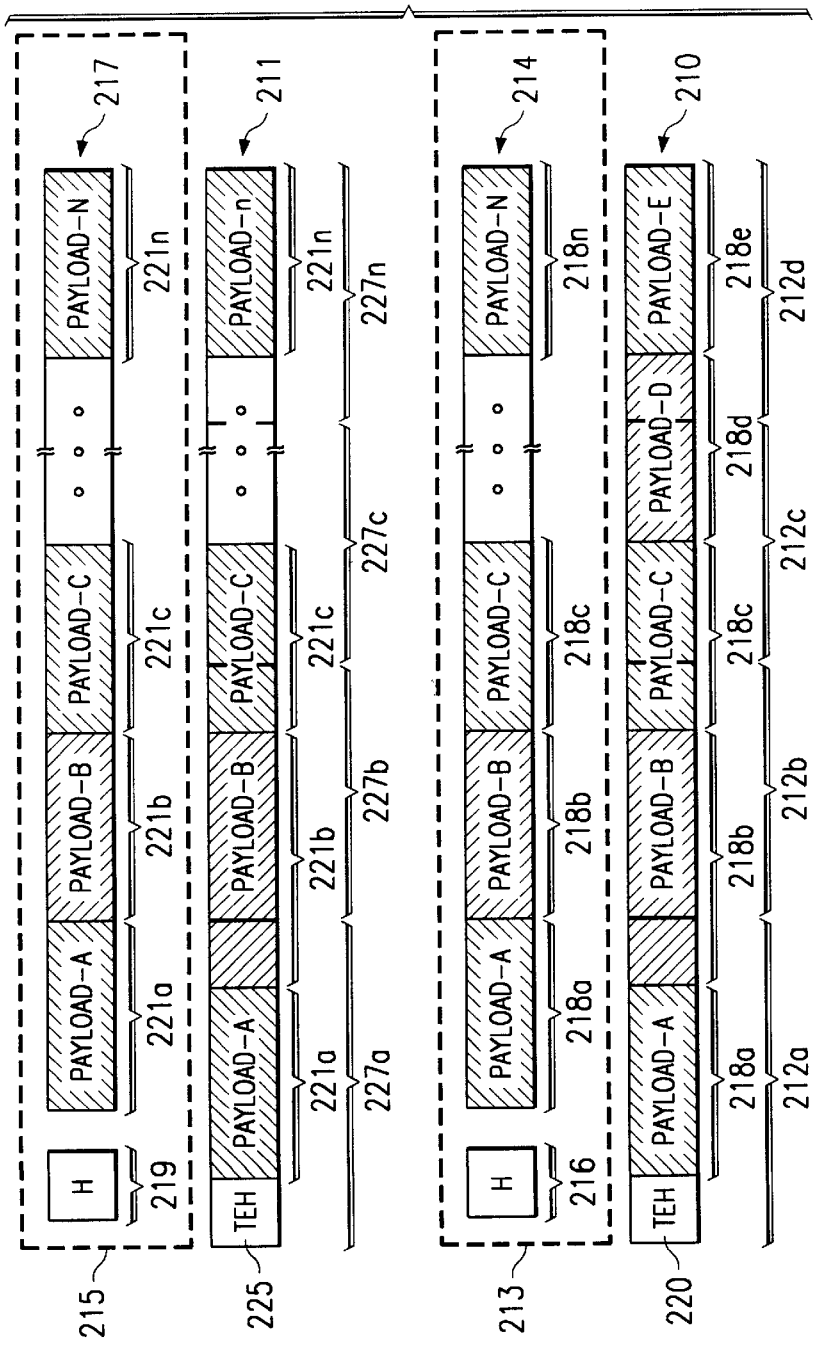

FIGS. 3A–3D show exemplary signals communicated by system 10. FIG. 3A shows exemplary protocol data units 213 and 215 awaiting transmission from host 12 to communications link 18. In the illustrated embodiment, each protocol data unit 213 and 215 includes a data block 214 and 217 containing ATM cell payloads 218 and 221, respectively. Each ATM cell payload 218a–218e is associated with ATM cell header information 216. Similarly, each ATM cell payload 221a–221n is associated with ATM cell header information 219. In the illustrated embodiment, each ATM cell payload 218 and 221 comprises 48 bytes of information. Each ATM cell header 216 and 219 comprises 4 bytes of information. Other sized ATM cell payloads and headers could be implemented without departing from the scope of the invention.

FIG. 3A also shows exemplary USB segments 210 and 211, which are communicated from host 12 to modem 16 over universal serial bus 14. Each USB segment 210 and 211 includes ATM cell payloads corresponding to a single protocol data unit, however, each segment need not necessarily contain an entire protocol data unit. In this case, USB segment 210 is associated with protocol data unit 213, while USB segment 211 is associated with protocol data unit 215. USB segments 210 and 211 are similar in structure and function, each capable of transporting ATM cell header information and a plurality of ATM cell payloads. For simplicity of description, the following discussion focuses on USB segment 210 and protocol data unit 213. It should be recognized that the discussion could apply equally to USB segment 211 and protocol data unit 215.

USB segment 210 includes a plurality of USB packets 212a–212d. In the illustrated embodiment, each USB packet 212 comprises 64 bytes of information. Host 12 prepares data block 214 for transmission over universal serial bus 14 by formatting ATM cell payloads 218a–218e and ATM cell header information 219 into USB packets 212 of USB segment 210 for transmission to modem 16 over universal serial bus 14. Information transmitted over universal serial bus 14 is typically transmitted in segments having 64-byte packets. An issue that arises when transmitting ATM cells over a universal serial bus is how to format conventional ATM cells, which typically include 52 or 53 bytes of information, into USB packets, such as 64-byte USB packets 212.

The present invention provides a unique and effective method of formatting ATM cell payloads 218 and ATM cell header information 216 into 64-byte USB packets 212 of USB segment 210, which optimizes the bandwidth of universal serial bus 14, and facilitates rate control of the resulting ATM cells at modem 16. Specifically, system 10 takes advantage of the fact that each of ATM cell payloads 218 shares common ATM header information 216. Rather than wasting bandwidth by transmitting the same ATM cell header information 216 with each ATM cell payload 218a–218e, system 10 forms USB segment 210 by forming a transmission encapsulation header 220 and appending thereto ATM cell payloads 218a–218e. Transmission encapsulation header 220 includes a single copy of ATM cell header information 216 common to each of ATM cell payloads 218a–218e, and rate control information facilitating rate control and scheduling at modem 16.

In a particular embodiment, USB segment 210 is formed by generating transmission encapsulation header 220 (which includes ATM cell header 216) appending ATM cell payloads 218a–218e thereto, and partitioning the concatenated information into 64 byte USB packets 212. In a similar manner, USB segment 211 is formed by generating a transmission encapsulation header 225 (which includes ATM cell header 219), appending ATM cell payloads 221a–221n thereto, and partitioning the concatenated information into 64-byte USB packets 227a–227m. For simplicity of discussion, the remainder of the description will focus on transmission encapsulation header 220. It should be noted that transmission encapsulation header 225 is similar in structure and function to transmission encapsulation header 220.

In the illustrated embodiment, transmission encapsulation header 220 and ATM cell payload 218a are encapsulated in a first USB packet 212a. As a particular example, transmission encapsulation header 220 may comprise 12 bytes, and ATM cell payload 218a may comprise 48 bytes. Together, transmission encapsulation header 220 and ATM cell payload 218a take up 60 of the 64 bytes of first USB packet 212a. The remaining 4 bytes of first USB packet 212a comprise the first 4 bytes of ATM cell payload 218b. USB packet 212b comprises the remaining 44 bytes of ATM cell payload 218b, and the first 20 bytes of ATM cell payload 218c. USB packet 212c contains the remaining 28 bytes of ATM cell payload 218c and the first 36 bytes of ATM cell payload 218d. Finally, USB packet 212d contains the remaining 12 bytes of ATM cell payload 212d and all 48 bytes of ATM cell payload 218e. The result is a USB segment, which transports five ATM cells and contains three 64-byte packets, and one 60-byte packet for a total of 252 bytes.

The present invention provides an advantage of more efficient use of bandwidth when compared to systems that encapsulate only a single ATM cell in each USB packet 212, and also when compared to systems that concatenate ATM cells including redundant header information 216. For example, if system 10 first associated each ATM cell payload 218 with ATM cell header information 216, and then placed each resulting ATM cell in a separate USB packet 212, that segment would require five 52-byte USB packets totaling 260 bytes to transmit the same information that system 10 transmits using only 252 bytes.

As segments become larger, the savings in bandwidth becomes more appreciable. For example, a small protocol data unit typically contains at least 1500 payload bytes, which is approximately 32 ATM cells. If each cell was first associated with its own copy of the ATM header information and then placed in a separate USB packet for transmission, the resulting system would require 1664 bytes to complete the transmission. In contrast, system 10 could take the same ATM payload information and format it into a USB segment with a transmission encapsulation header having a single copy of the ATM header information. The resulting transmission using system 10 would require only 1512 bytes, a savings of 152 bytes. In addition, system 10 offers bandwidth savings by using fewer USB packets, since each USB packet is associated with some bandwidth use for USB overhead.

Figure 3B:
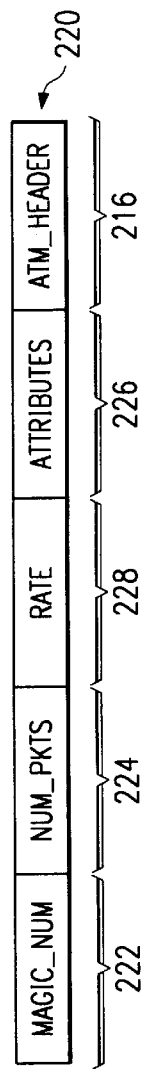

FIG. 3B shows an exemplary transmission encapsulation header 220. In this embodiment transmission encapsulation header 220 comprises a 12-byte packet. Transmission encapsulation header 220 includes a MAGIC_NUM field 222, which contains a code that controller 40 can use to identify the beginning of a new transmission encapsulation header. As modem 16 receives USB segments 210, controller 40 examines the first 4 bytes of transmission encapsulation header 220, which comprise MAGIC_NUM field 222. Controller 40 is programmed to recognize the value stored in MAGIC_NUM field 222 as marking the start of a new USB segment 210.

Transmission encapsulation header 220 also includes a NUM_PKTS field 224, which indicates the number of USB packets 212 associated with USB segment 210. Controller 40 uses NUM_PKTS 224 to delineate the length of USB segment 210. In the illustrated embodiment, controller 40 is programmed to accept only the number of USB packets 212 indicated in NUM_PKTS field 224, and to ignore any additional USB packets 212 received beyond that number, unless and until another transmission encapsulation header 220 is encountered. NUM_PKTS field 224 can be useful in determining which ATM cell payload 218 is associated with the last cell of USB segment 210. This information can be useful, for example, in notifying host 12 that the last cell of a segment has been transmitted. In light of the limited usefulness of the flow control mechanisms of the universal serial bus, it may be advantageous to notify host 12 upon completion of a particular segment, to allow host 12 schedule another segment without triggering the USB flow control mechanisms.

Transmission encapsulation header 220 also includes an ATTRIBUTES field 226. ATTRIBUTES field 226 may comprise various information relating to or otherwise describing USB segment 210. For example, ATTRIBUTES field 226 may include a RATE_CHANGE flag, which, when activated, indicates that the current USB segment 210 contains ATM cell information to be transmitted at a new rate. As another example, ATTRIBUTES field 226 may contain a LAST_SEGMENT flag which signifies that the current USB segment 210 is the last USB segment of a particular protocol data unit. This information is useful where a group of ATM cells associated with a particular protocol data unit is transmitted in more than one USB segment 210. ATTRIBUTES field 226 could also include a NOTIFY_HOST flag. This flag may be useful, for example, to enable controller 40 to notify host 12 of the completion of transmission of a USB segment, allowing host 12 to schedule that virtual channel with a cells from a new segment. This may be particularly useful in avoiding invocation of the comparatively poor flow control mechanisms built into typical universal serial buses.

Transmission encapsulation header 220 further includes a RATE field 228, which specifies the transmission rate associated with the ATM cells information in USB segment 210. System 10 uses the information in RATE field 228 to perform rate control and scheduling functions on the ATM cell information received at modem 16. In a particular embodiment, RATE field 228 comprises a one-byte index to a table of transmission rates stored at modem 16. Details of that particular embodiment will be described below.

As previously indicated, transmission encapsulation header 220 includes ATM cell header information 216, which is common to ATM cell payloads 218a–218e. Upon receiving USB segment 210, controller 40 stores ATM header information 216 for use in formatting a plurality of ATM cells 314 (see FIG. 3C) to be transmitted over communications link 18. In the illustrated embodiment, controller 40 passes ATM header information 216 to transmission manager 152 of communications manager 50 for storage in on-chip memory 168. Controller 40 then passes ATM cell payloads 218 to transmission manager 152, where transmission manager 152 associates each ATM cell payload 218 with a copy of ATM cell header information 216.

FIG. 3C shows exemplary ATM cells 314a–314e, which are assembled by transmission manager 152. In this embodiment, each ATM cell 314a–314e comprises a 64-byte cell, which includes a copy of ATM cells header information 216 and an ATM cell payload 218a–218e, respectively. Each ATM cell 314 also includes a 1-byte CONTROL_FLAG field 320. Each CONTROL_FLAG field 320 contains a TX_RATE field 322, which specifies a transmission rate associated with the ATM cell 314 and a TX_END_FLAG 324, which indicates whether the particular ATM cell 314 is the last cell of USB segment 210. Where ATM cells information is transmitted in USB segment 210, the information stored in TX_RATE field 322 and TX_END_FLAG 324 is determined by examining transmission encapsulation header 220. In a particular embodiment, TX_RATE field 228 contains a non-zero entry only if the rate associated with that ATM cell 314 differs from the rate associated with the last cell transmitted from that transmission memory 170.

In operation, transmission manager 152 receives ATM header information 216 from controller 40 and stores ATM header information 216, for example, in one or more registers 174 in on-chip memory 168. As transmission manager 152 receives ATM cell payloads 218a–218e, it formats ATM cells 314a–314e by appending each ATM cell payload to a copy of ATM header information 216. In a particular embodiment, transmission manager 152 formats each ATM cell 314 into a 64-byte ATM cell 314, which includes reserved portion 316 and CONTROL_FLAG field 320. Reserved bytes 316 are empty in this implementation, but could be used to store various status or other information pertaining to ATM cells 314.

As transmission manager 152 assembles each ATM cell 314, it places the cell into the transmission memory 170 associated with the endpoint 114 on which the USB segment 210 (which included ATM cell header information 216 and ATM cell payload 218) was received. In this particular embodiment, each transmission memory 170 comprises a first-in-first-out (FIFO) data structure capable of storing up to 256 64-byte ATM cells 314 awaiting transmission over communications link 18.

FIG. 3D shows an exemplary protocol data unit 270 received by modem 16 from communications link 18. This particular protocol data unit 270 includes a plurality of ATM cells 272a–272c. Each ATM cell 272 includes ATM cell header information 274 and an ATM cell payload 276. FIG. 3D also shows exemplary USB packets 278a–278c, referred to generally as USB packets 278. In the illustrated embodiment, each USB packet 278 comprises a 64-byte packet. Other sized packets could be used without departing from the scope of the invention.

Modem 16 formats ATM cells 272 received from communications link 18 into USB packets 278 for transmission over universal serial bus 14 to host 12 by filling each USB packet 278 with concatenated ATM cells 272. In the illustrated embodiment, USB packets 278a and 278b comprise full 64-byte USB packets, which are eligible for transmission to host 12. In a particular embodiment, modem 16 transmits each USB packet 278 to host 12 as soon as that packet is full.

USB packet 278c contains only the last 28 bytes of ATM cell payload 276c. In other words, portion 280 of USB packet 278c currently remains empty. In this case, USB packet 278c will be transmitted to host 12 only if short packet instigator 144 of communications manager 50 has identified a termination condition. For example, short packet instigator 144 may determine that a packet timer has expired or that, upon the addition of ATM cell 272c, the current host buffer will be full. Alternatively, short packet instigator 144 may determine that the contents of ATM cell 272c indicate a termination condition. For example, ATM cell 272 may contain an indication that it is the last cell of a particular PDU; or, ATM cell 272c may comprise a resource management cell or an operations administration and maintenance cell. In any of these cases, short packet instigator 144 may transmit USB packet 278c with less than 64 bytes of information, causing a termination of the current host buffer, which transfers the contents of the host buffer to driver 32.

If no termination condition is identified, communication of USB packet 278c will be postponed until the packet is full, or a termination condition is encountered.

Figure 4:
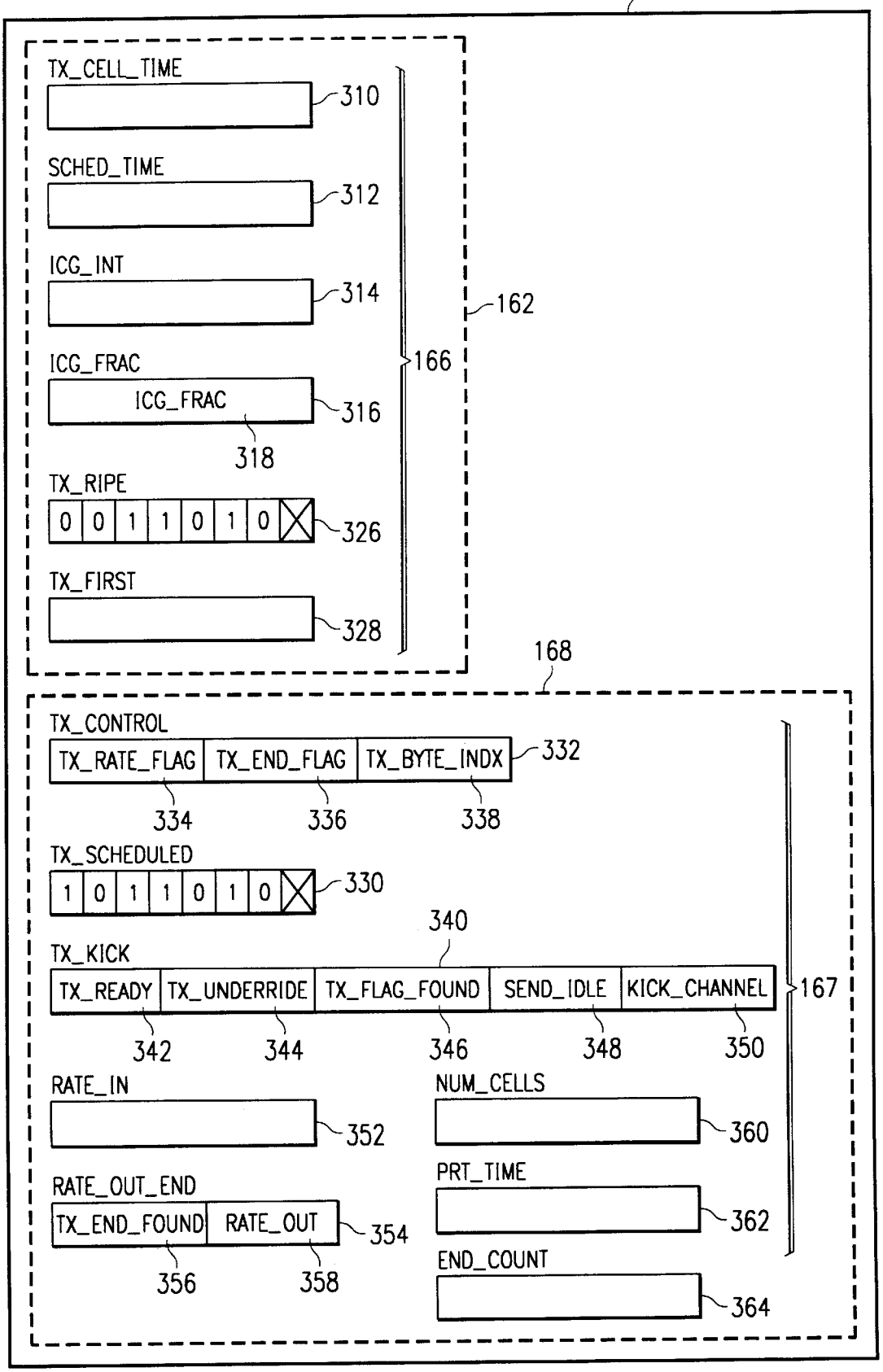
FIG. 4 is a block diagram showing exemplary memory structures within the modem constructed according to the teachings of the present invention.

FIG. 4 is a block diagram showing exemplary registers stored within modem memory 16. System 10 may utilize a plurality of registers or other storage structures to temporarily store information used during its scheduling and rate control algorithms. In a particular embodiment, controller 40 may access a plurality of control registers 166 stored within external memory 162. Control registers 166 may comprise any data structures, compilations, or arrangements of data operable to facilitate storage and retrieval of various types of information.

In this example, control registers 166 include a TX_CELL_TIME register 310. TX_CELL_TIME register 310 tracks each transmission opportunity, and is incremented by one each time a data cell or an idle cell is passed to line interface 70 for transmission across communications link 18. In a particular embodiment, TX_CELL_TIME register 310 comprises a MOD-128 counter, which counts values from zero to 127, and then recycles.

In addition, control registers 166 include a SCHED_TIME register 312. SCHED_TIME register 312 stores, for each transmission memory 170, a value specifying the number of transmission opportunities that must pass before another cell from that transmission memory 170 can be transmitted to line interface 70. The value of SCHED_TIME 312 is measured relative to TX_CELL_TIME 310. When the value of SCHED_TIME 312 associated with a particular transmission memory 170 is equal to TX_CELL_TIME 310, that transmission memory 170 is considered "ripe" for transmission. In this embodiment, ATM cells 314 cannot be transmitted from transmission memories 170 until they are ripe for transmission.

In the illustrated embodiment, SCHED_TIME register also serves the function of tracking a transmission error associated with a particular channel. After a channel is designated as "ripe," the value that was stored in SCHED_TIME register 312 to determine whether the channel was ripe is not needed. System 10 takes advantage of this fact to reuse the same memory space for another function. Specifically, SCHED_TIME register 312 is used to keep track of the number of transmission opportunities that pass without transmitting from the ripe channel. This can occur, for example, where other channels are also ripe and contain higher priority cells for transmission. This value can then be used to modify the SCHED_TIME associated with a rescheduling of another cell from the same channel to compensate for the transmission error.

Controller 40 tracks which transmission memories 170 are ripe for transmission in a TX_RIPE register 326. TX_RIPE register 326 is a bit-mapped register, wherein each bit provides an indication of whether a particular transmission memory 170 contains data ripe for transmission. In this particular embodiment, TX_RIPE register 326 comprises a 1-byte register. Each of the seven most significant bits (bits 1-7) corresponds to the status of one of the seven transmission memories 170a–170g. In this example, bits 3, 4, and 6 contain a "1," indicating that the 3rd, 4th, and 6th transmission memories (170c, 170d, and 170f) contain data that is ripe for transmission. On the other hand, bits 1, 2, 5, and 7 of TX_RIPE register 326 contain a "0." In that case, the 1st, 2nd, 5th, and 7th transmission memories (170a, 170b, 170e, and 170g) do not contain any data that is ripe for transmission.

In the illustrated embodiment, cell transmission rates are measured in terms of an inter-cell gap. An inter-cell gap measures a number of cell transmission opportunities that ordinarily occur between transmission of successive cells of a single protocol data unit. In this embodiment, control registers 166 include an ICG_INT register 314, and an ICG_FRAC register 316. ICG_INT register 314 and ICG_FRAC register 316 store the integer and fractional values, respectively, of the inter-cell gap associated with a current transmission rate. Although system 10 described here uses fixed point mathematics, the invention is equally applicable to systems implementing floating point mathematics.

Control registers 166 also include a TX_FIRST register 328. TX_FIRST register 328 specifies the first transmission memory 170 that controller 40 should examine in running its scheduling and rate control algorithms. The first transmission memory 170 to be checked may be determined, for example, in a round robin fashion by designating the first transmission memory 170 as the transmission memory 170 immediately following the transmission memory 170 that last transmitted. Alternatively, the first transmission memory 170 can be determined based on relative transmission priorities associated with ATM cells 314 stored in each transmission memory 170. Other methods of determining which transmission memory 170 to check first could be used without departing from the scope of the invention.

Controller 40 and communications manager 50 may also access a plurality of status registers 167, which are stored in on-chip memory 168 of modem 16. Status registers 167 may comprise any storage structures, compilations, or arrangements of data operable to facilitate storage and retrieval of various information by physical and/or logical components of modem 16. Although status registers 167 are described as residing in on-chip memory 168, they could alternatively reside in external memory 162, or another memory accessible to modem 16.

Status registers 167 include a TX_SCHEDULED register 330. TX_SCHEDULED register 330 is a bit-mapped register, wherein each bit provides an indication of whether a particular transmission memory 170 contains data cells, in this case ATM cells 314. A "1" in TX_SCHEDULED register 330 indicates that the transmission memory 170 associated with that bit contains data cells. A "0" indicates that the transmission memory 170 associated with that bit contains no data cells. In this example, the 1st, 3rd, 4th, and 6th most significant bits of TX_SCHEDULED register 330 contain "1," signifying that transmission memories 170a, 170c, 170d, and 170f contain transmit ATM data cells 314. On the other hand, the 2nd, 5th, and 7th most significant bits of TX_SCHEDULED register 330 contain "0," indicating that transmission memories 170b, 170e, and 170g contain no transmit ATM data cells 314.

In this embodiment, transmission memories 170 are eligible for transmission when they are both scheduled and ripe for transmission. In other words, a particular transmission memory 170 must contain data cells to be transmitted, and a particular number of transmission opportunities must have occurred since the last transmission on that channel. In this example, TX_SCHEDULED register 330 shows that transmission memories 170e and 170g (associated with the 5th and 7th most significant bits, respectively, TX_SCHEDULED register 330) are not eligible for transmission because they do not contain any data to be transferred. Transmission memory 170a is also not eligible for transmission because, although it contains transmit ATM data cells 314 (as indicated by the "1" in the most significant bit of TX_SCHEDULED register 330), it is not ripe for transmission (as indicated by the "0" in the most significant bit of TX_RIPE register 326). Finally, TX_SCHEDULED register 330 and TX_RIPE register 326 indicate that transmission memories 170c, 170d, and 170f are all eligible for transmission. The "1" in each of the register positions associated with those transmission memories show that each one contains transmit ATM data cells 314 and that each one is both scheduled and ripe for transmission.

Status registers 167 also include a TX_CONTROL register 332. TX_CONTROL register 332 stores various status information used by controller 40 during its scheduling and rate control algorithms. For example, TX_CONTROL register 332 includes a TX_RATE_FLAG 334, which controller 40 sets to notify transmission manager 152 that it is passing an ATM cell payload 218 associated with a new transmission rate. TX_CONTROL register 332 also includes a TX_END_FLAG 336, which controller 40 uses to notify transmission manager 152 that it is passing the last ATM cell payload 218 of a particular USB segment 210. TX_CONTROL register 332 further includes a TX_BYTE_INDX field 338. Controller 40, in this embodiment, transmits ATM cell information to transmission manager 152 in 64-byte increments. Where ATM payloads 218 are concatenated, controller 40 uses TX_BYTE_INDX 338 to mark the byte position of the first byte of each USB packet 212. This information is used when extracting a partial ATM cell payload 218 from the beginning of a USB segment 212 to determine where, within the ATM cell payload 218, the first byte of USB packet 212 lies.

Status registers 167 also include a TX_KICK register 340. TX_KICK register 340 includes a TX_READY field. Transmission manager 152 uses TX_READY field 342 to indicate to controller 40 that it is ready to schedule a cell transmission. TX_KICK register 340 also includes a TX_UNDERRIDE field 344. TX_UNDERRIDE field 344 indicates that a cell transmission opportunity was missed and that transmission manager 152 has sent at least one idle cell to line interface 70 for transmission.

TX_KICK register 340 further includes a TX_FLAG_FOUND field 346. TX_FLAG_FOUND field 346 indicates that a flag was found in the transmission memory 170 associated with the most recently transmitted cell. TX_KICK register 340 still further includes a SEND_IDLE field 348. Controller 40 uses SEND_IDLE field 348 to instruct transmission manager 152 to transmit an idle cell. This may occur, for example, where controller 40 checks TX_SCHEDULED register 330 and TX_RIPE register 326, and discovers that none of transmission memories 170 contain data cells that are ripe for transmission.

TX_KICK register 340 still further includes a KICK_CHANNEL field 350. After conducting its scheduling and rate control algorithms, controller 40 writes the number of the channel, or transmission memory 170 associated with the channel that transmission manager 152 should send data from at the next cell transmit opportunity. If there are no ATM cells 314 eligible for transmission (either because none are scheduled, or because no scheduled cells are ripe), controller leaves this field empty and writes a "1" to SEND_IDLE field 348 of TX_KICK register 340, which instructs communication manager 50 to transmit an idle cell.

Status registers 167 may also include a RATE_IN register 352 and a RATE_OUT register 354. When controller 40 receives a USB segment 210, it examines the transmission encapsulation header to determine if the RATE_CHANGE ATTRIBUTE 226 associated with ATM cells 314 of that USB segment 210 has been set. If that bit is set, controller 40 sets TX_RATE_FLAG 334 to "1" and writes RATE_CODE 229 into the seven least significant bits of RATE_IN register 352. Additionally, if NOTIFY_HOST attribute 226 has been set in transmission encapsulation header 220, controller 40 writes a "1" to the most significant bit of RATE_IN register 352. As communication manager 50 constructs ATM cells 314, it reads TX_RATE_FLAG 334. If TX_RATE_FLAG 334 is set to "1," communications manager 50 writes the rate code stored in RATE_IN register 352 into the TX_RATE field 322 of ATM cell 314. Otherwise, communications manager 50 writes a rate code of zero into TX_RATE field 322.

RATE_OUT_END register 354 includes a TX_END_FOUND flag 356 and a RATE_OUT field 358. TX_END_FOUND flag 356 comprises the most significant bit of RATE_OUT_END register 354, and contains a flag that notifies communication manager 50 that the ATM cell 314 being removed from transmission memory 170 for transmission to line interface 70 is the last cell of a particular USB segment 210. TX_END_FOUND flag 356 is set to "1" if the ATM cell 314 being read from transmission memory 170 is the last cell of USB segment 210 and the NOTIFY_HOST attribute 226 was set in transmission encapsulation header 220. If TX_END_FOUND flag 356 is set to "1," communications manager 50 sets TX_FLAG_FOUND field 346 of TX_KICK register 340 to "1," which instructs controller 40 to notify host 12 that the last cell of a particular USB segment 210 is being transmitted, and that it is safe to schedule ATM cells associated with another virtual channel to that transmission memory 170.

RATE_OUT field 358 holds the rate code associated with the ATM cell 314 currently being removed from transmission memory 170. RATE_OUT field 358 is updated with the rate code contained in TX_RATE field 322 of ATM cell 314 being removed from transmission memory 170. If TX_RATE field 322 is not zero, communications manager 50 sets TX_FLAG_FOUND field 346 of TX_KICK register 340 to "1," which instructs controller 40 to read the new rate code from RATE_OUT field 358 during its rate control algorithm.

Status registers 167 also include various storage structures used in communicating ATM cells 272, which were received from communications link 18, to host 12. These storage structures include a NUM_CELLS register 360, which holds the value of the number of cells that each host buffer in receive memory 34 holds. Communications manager 50 tracks the number of ATM cells 272 transmitted to each host buffer. When Communications manager 50 recognizes that a particular ATM cell 272 is the last cell that will fit in the current host buffer, communications manager 50 short packets the host buffer. Communications manager 50 typically accomplishes the short packeting by sending that ATM cell 272 in a partially filled USB packet 278. Where, however, ATM cell 272 happens to fill the USB packet 278 into which it is placed, short packeting can be accomplished by transmitting a zero-byte USB packet immediately following the full USB packet 278.

Status registers 167 also comprise a PKT_TIME register 362, which stores a value indicating a maximum time allotted to fill a host buffer. Communications manager 50 keeps track of the time that passes after a first ATM cell 272 is loaded to the current host buffer. Once that time exceeds the value in PKT_TIME register 362, communications manager initiates a short packet to terminate the host buffer. The values stored in NUM_CELLS register 360 and PKT_TIME register 362 can be tuned to provide a balance between the latency caused in buffering cells prior to receipt by driver 32 and the processing burden placed on the operating system of host 12 in requesting additional buffers.

Status registers 167 also include an END_COUNT register 364. END_COUNT register 364 stores an indication of whether short packet instigator 144 has identified a termination condition associated with the content of one of ATM cells 272. For example, ATM cell 272 may contain an indication that it is the last cell of a particular PDU; or, ATM cell 272c may comprise a resource management cell or an operations administration and maintenance cell. In such cases, ATM cell 272 contains data that driver 32 may be particularly interested in. As such, it may be desirable to forward this particular ATM cell 272 to driver 32 without waiting for the current host buffer to completely fill.

Where short packet instigator 144 recognizes a termination condition associated with the content of ATM cell 272, it increments the value in END_COUNT register 364. When receive manager 154 formats ATM cells 272 into USB packets 278, it checks END_COUNT register 364. If a termination condition associated with the content of ATM cells 272 has been encountered, as indicated by a non-zero value in END_CONDITION register 364, receive manager 154 generates a short packet and decrements the value of END_CONDITION register 264 by one.

In a particular embodiment, receive manager 154 does not terminate the current host buffer while ATM cells 272 remain in receive memory 172 and the host buffer has enough room to accumulate more cells. Rather, receive manager 154 sends the ATM cells 272 remaining in receive memory 172 ending with a short packet, which may comprise a zero-byte short packet. Receive manager 154 then decrements the value of END_COUNT 364 by one. Receive manager continues to examine each ATM cell header for a termination condition, incrementing END_COUNT each time a termination condition is encountered. Each time a short packet is initiated, END_COUNT 364 is decremented. System 10 continues to short packet ATM cells 272 to host 12 until the value in END_COUNT register 364 is zero.

Figure 5:
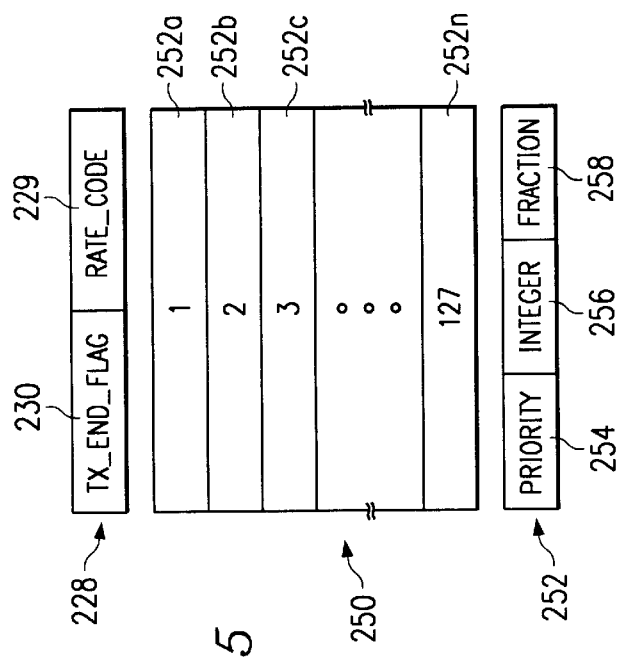
FIG. 5 is a block diagram of an exemplary rate table constructed according to the teachings of the present invention.

FIG. 5 is a block diagram of an exemplary rate table 250 constructed according to the teachings of the present invention. In a particular embodiment, RATE field 228 specified in transmission encapsulation header 220 may comprise a RATE_CODE 229 that can be used to index a table 250 of transmission rates. In this example, RATE_CODE 229 comprises a 7 bit string, which is used to index a particular entry in a table 250 of transmission rates.

Table 250 may comprise any data structure, compilation, or arrangement of data. In this particular example, Table 250 comprises a 127 row table of 2-byte entries 252a–252n. Each entry 252 includes a PRIORITY field 254, an INTEGER field 256, and a FRACTION field 258. PRIORITY field 254 allows system 10 to designate particular USB segments 210 as having a "high," "medium," "low," or other level of transmission priority relative to other segments 210. INTEGER field 256 comprises a value specifying the integer value of the transmission rate (specified in number of cell transmission times). FRACTION field 258 comprises a value specifying the fractional value of the transmission rate. In the illustrated embodiment, PRIORITY field 254 comprises a two-bit field. INTEGER field 256 and FRACTION field 258 occupy the remaining 14 bits of each entry 252, each comprising 7 bits.

The present invention provides an advantage of allowing system 10 great flexibility in transmission rate specification. For example, if a large range of transmission rates is important, the bits allotted to INTEGER field 256 can be increased to allow for specification of larger inter-cell gaps. If, on the other hand, high accuracy is desired, the bits allotted to FRACTION field 258 can be increased to provide a high level of granularity in rate specification. System 10 can provide any level of granularity and range by either customizing the number of bits allotted to each at the expense of the other, or by increasing the width of rate table 250. Using a rate index 228 to indirectly specify a transmission rate associated with each USB segment 210 provides significant flexibility, which is unavailable in conventional direct rate specification methods.

Figure 6B:
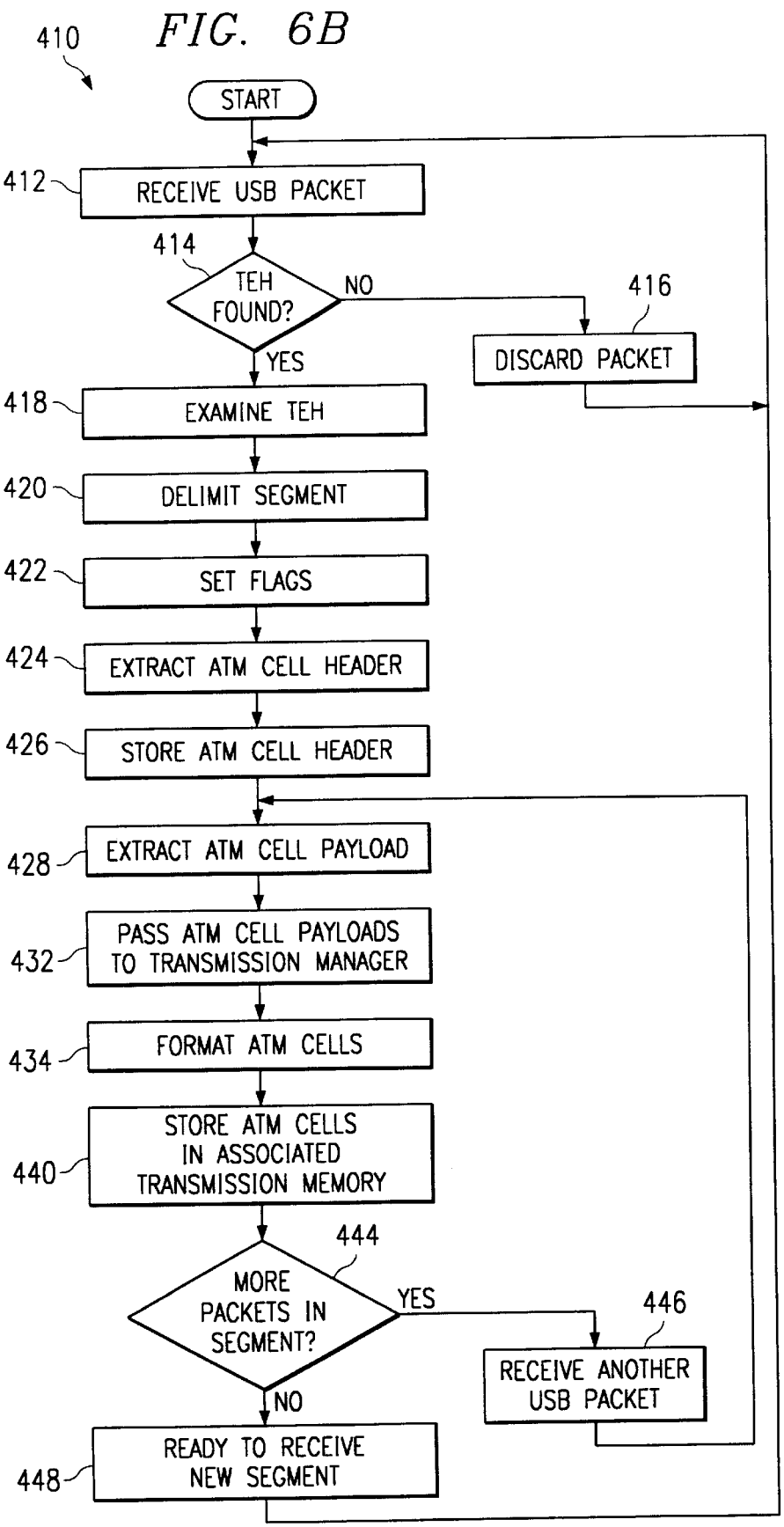

FIGS. 6A–6D are flow charts showing an exemplary method of communicating information from host 12 to communications link 18 using universal serial bus 14. FIG. 6A is a flow chart showing an exemplary method 400 of communicating information between host 12 and communications link 18 using universal serial bus 14. Method 400 begins at step 401 where host 12 receives one or more data blocks, each data block comprising one or more ATM cell payloads associated with a common protocol data unit. Host 12 formats the data blocks into USB segments at steps 402 and 403. Formatting data blocks into ATM cells could comprise associating each ATM cell payload of the data block with ATM cell header information to generate a plurality of ATM cells. In another embodiment, formatting data blocks into USB segments could comprise generating a transmission encapsulation header, such as transmission encapsulation header 220, for each USB segment. In that case, the USB segment includes a plurality of concatenated ATM cell payloads from the data block and a single copy of the ATM cell header information associated with those payloads.

Host 12 embeds rate control information, such as RATE_CODE 229, into, for example, the transmission encapsulation header, to facilitate rate control of the ATM cells of the USB segment at modem 16.

Host 12 identifies a USB endpoint 114 for each USB segment. In this embodiment, each USB endpoint 114 is associated with a particular transmission memory 170 at modem 16. Host 12 identifies a transmission channel of communications link 18 over which the ATM cells in the first and second USB segments should be transmitted, and associates each USB segment with a USB endpoint 114 corresponding to that transmission channel. Host 12 then transmits the first and second USB segments to the identified USB endpoints 114 at step 404.

Modem 16 receives a plurality of ATM cells from universal serial bus 14 at step 410. Receiving a plurality of ATM cells from the universal serial bus refers generally to receiving a plurality of ATM cell payloads 218, and at least one copy of ATM cell header information 216 associated with ATM cell payloads 218. Receiving a plurality of ATM cells refers not only to the case where modem 16 receives formatted ATM cells each including a copy of ATM header information 216, but also to situations where a plurality of ATM cell payloads 218 are transmitted with a single copy of ATM cell header information 216. For example, receiving a plurality of ATM cells encompasses receiving a USB segment comprising a plurality of concatenated ATM cell payloads and a transmission encapsulation header including a single copy of ATM cell header information 216.

In a particular embodiment, modem 16 receives a first USB segment 210 including a first plurality of ATM cell payloads 218 and associated ATM cell header information 216 at step 405. Modem memory stores the first plurality of ATM cell payloads 218 and associated ATM cell header information 216 in modem memory 60 at step 406. Modem 16 may format individual ATM cells 314 prior to storing the ATM cell information in modem memory 60, for example, where ATM cell header 216 and ATM cell payloads 218 are received in a concatenated payload format.

Modem 16 receives a second USB segment 211 including a second plurality of ATM cell payloads 221 and associated ATM cell header information 219 at step 407. Modem 16 stores second plurality of ATM cell payloads 221 and associated ATM cell header information in modem memory 60 at step 408. Modem 16 may format individual ATM cells 317 prior to storing the ATM cell information in modem memory 60, for example, where ATM cell header 219 and ATM cell payloads 221 are received in a concatenated payload format.

Modem 16 then schedules transmission of each ATM cell at a transmission rate associated with that cell at step 460. In a particular embodiment, step 460 includes using rate control information received with the first plurality of ATM cells to schedule transmission of the first plurality of ATM cells (which include ATM cell payloads 218a–218e, each associated with a copy of ATM cell header information 216) at a first transmission rate associated with the first plurality of ATM cells at step 462. In addition, step 460 may include using the rate control information received with the second plurality of ATM cells to schedule transmission of the second plurality of ATM cells (which include ATM cell payloads 221a–221n, each associated with a copy of ATM cell header information 219) at a second transmission rate associated with the second plurality of ATM cells at step 464.

In performing scheduling step 460, modem 16 may adjust the transmission rates associated with each ATM cell payload 218 and 221 to compensate for various delays experienced in transmitting previous ATM cell payloads of the same USB segment. In addition, modem 16 may recognize that the final ATM cell payload of a particular segment is being transmitted, and in response, transmit a notification to host 12 that the last cell of that segment has been transmitted. Details regarding these steps are described in more detail with respect to FIGS. 6C and 6D.

Scheduling each ATM cell at its associated transmission rate at step 460 enables modem 16 to transmit the first plurality of ATM cells at approximately the first transmission rate and to transmit the second plurality of ATM cells at approximately the second transmission rate at step 490.

The order of the steps in FIG. 6A is not intended to limit the invention to a particular order of steps. Various steps could be performed at various times without departing from the scope of the invention. For example, system 10 continuously receives additional data blocks, formats the data blocks into USB segments, and transmits the USB segments over universal serial bus 14. Similarly, modem 12 continuously receives USB segments containing additional ATM cells associated with various transmission rates. System 10 continuously schedules transmission of ATM cells and transmits cells over communications link 18. As new cells are received from universal serial bus 14, system 10 continues to schedule transmission and transmit the cells it has previously received.

FIG. 6B shows details of steps 410 and 440 of receiving the plurality of ATM cells and storing the plurality of ATM cells in modem memory 60. For simplicity, the method 410 is described only with reference to ATM cell header 216 and associated ATM cell payloads 218 associated with USB segment 210. The method applies equally to processing ATM cells associated with second USB segment 211.

The method 410 begins at step 412, where controller 40 of modem 16 receives USB packet 212. In this embodiment, controller 40 is programmed to accept USB packets 212 only after recognizing a transmission encapsulation header (TEH) 220 associated with USB packet 212. Controller 40 examines USB packet 212 to determine if it contains transmission encapsulation header 220 at step 414. Specifically, controller 40 examines the first 4 bytes of USB packet 212a to determine whether MAGIC_NUM 220 matches a code programmed into controller 40 for recognizing transmission encapsulation headers 220. If, at step 414, controller 40 does not recognize MAGIC_NUM 222 as identifying a transmission encapsulation header 220, controller 40 discards USB packet 212 at step 416 and awaits receipt of another USB packet 212.

If, on the other hand, controller 40 finds a match with MAGIC_NUM 222 at step 414, it proceeds by examining transmission encapsulation header 220 at step 418. Controller 40 delimits the extent of the current USB segment 210 at step 420. In the illustrated embodiment, controller 40 determines the length of USB segment 210 by examining NUM_PKTS field 224, which indicates the number of USB packets 212 in the current USB segments 210. By knowing the number of USB packets 212 in each USB segment 210, controller 40 knows how many USB packets 212 it can process before it needs to look for another transmission encapsulation header 220. Once controller 40 processes the number of USB packets 212 indicated in NUM_PKTS field 224, controller 40 knows that it should expect a transmission encapsulation header 220 in the next USB packet 212 it receives. If, after processing the number of USB packets 212 indicated in NUM_PKTS field 224, controller 40 receives another USB packet 212 that does not contain a transmission encapsulation header 220, it assumes that USB packet 212 was received in error and discards it.

Controller 40 uses information in transmission encapsulation header 220 to set various flags in control registers 162 and status registers 168 at step 422. For example, controller 40 examines ATTRIBUTES field 226 of transmission encapsulation header 220 to determine whether a RATE_CHANGE flag has been set, indicating that ATM cells associated with this USB segment 210 are associated with a different transmission rate than the cells associated with the last USB segment 210 received on the same USB endpoint 114. If the RATE_CHANGE flag is set, controller 40 writes the RATE_CODE 229 into RATE_IN register 352, and sets TX_RATE_FLAG 334 in TX_CONTROL register 332 to "1," which instructs communications manager 50 to write the rate code from RATE_IN register 352 into TX_RATE field 322 of at least one ATM cell 314 associated with this segment. In a particular embodiment, communications manager 50 writes the rate code from RATE_IN register 352 only into TX_RATE field 322 of the first ATM cell 314a of that segment. This reduces the processing burden on modem 16 when adjusting rate control parameters upon encountering a new transmission rate. The present invention provides an advantage of sending rate control information, such as RATE_CODE 229 along with the ATM cells to be transmitted. System 10 utilizes this information in its scheduling and rate control algorithms to transmit each segment of ATM cells at or near their associated transmission rates.

Controller 40 extracts ATM cell header information 216 from transmission encapsulation header 220 at step 424. ATM cell header information 216 is then stored at step 426. In this embodiment, ATM cell header information 216 is stored in ATM cell header registers residing, for example, in on-chip memory 168.

Controller 40 next extracts an ATM cell payload 218 from the current USB packet 212 at step 428. In the illustrated embodiment, controller 40 receives first USB packet 212a, which includes a first ATM cell payload 218a comprising an entire 48-byte ATM cell payload and 4 bytes of ATM cell payload 218b. In this embodiment, controller 40 initially writes a value of "0" into TX_BYTE_INDX field 338 to indicate that the first byte being transferred corresponds to the first byte of ATM cell payload 218a. Transmission manager 152 keeps track of the cell payload index during a transfer after the first initialization by the controller. Once ATM cell 314a (which includes ATM cell payload 218a) has been formatted, TX_BYTE_INDX field 338 will contain an indication that the first byte being transferred from USB packet 212b is the fifth byte of ATM cell payload 218b. Transmission manager 152 uses TX_BYTE_INDX field 338 to keep track of the byte position within the current ATM cell payload 218 corresponding to the first byte being removed from each USB packet 112.

Controller 40 passes ATM cell payloads 218 to transmission manager 152 at step 432. Transmission manager 152 receives ATM cell payload 218 and formats an ATM cell 314 at step 434. Transmission manager 152 formats each ATM cell 314 by associating each ATM cell payload 218 it receives with a copy of ATM cell header information 216. In this particular embodiment, transmission manager 152 also includes FLAG byte 320 in each ATM cell 314. FLAG byte 320 includes TX_END_FLAG field 324 and TX_RATE field 322. If ATM cell 314 is the last cell of the associated USB segment 210, and NOTIFY_HOST attribute 226 was set in the associated transmission encapsulation header 220, transmission manager 152 sets TX_END_FLAG 324 to "1." If TX_RATE_FLAG 334 was set in response to a set RATE_CHANGE flag in transmission encapsulation header 220, transmission manager 152 also writes the rate code stored in RATE_IN register 352 into TX_RATE field 322.

Transmission manager 152 stores each ATM cell 314 in an associated transmission memory 170. Each transmission memory can correspond to one or more USB endpoints 114. In this particular embodiment, each transmission memory 170 is associated with a single USB end point 114. In this embodiment, driver 32 of host 12 associates each USB end point 114 with a particular virtual channel. Driver 32 can assign ATM cells associated with a particular protocol data unit 213 to a particular virtual channel by transmitting those ATM cells to the USB end point 114 corresponding to the desired virtual channel. Thus, in the illustrated embodiment, transmission manager 152 stores each ATM cell 314 in a transmission memory 170 associated with a particular USB end point 114, which corresponds to a virtual channel assigned by driver 32.

Controller 40 continues to accept and process USB packets 212 until it determines at step 444 that it has reached the last USB packet 212 in the current USB segment 210. In this embodiment, controller 40 makes this determination by comparing the number of USB packets 212 received in this USB segment 210 to the value stored in NUM_PKTS in transmission encapsulation header 220. Once this limit has been met, controller 40 is ready to receive another USB segment 210 at step 446.

Figure 6C:
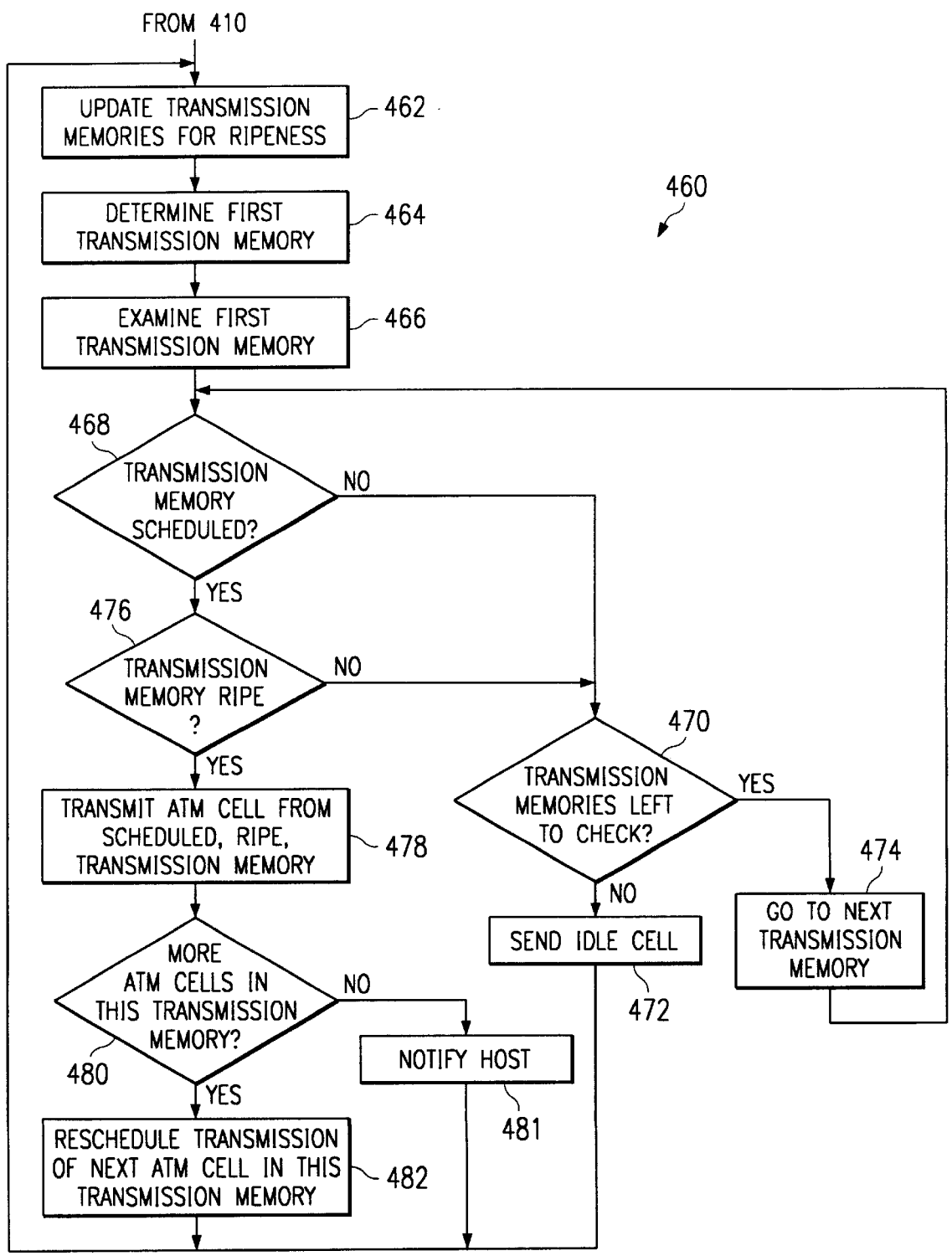

FIG. 6C is a flow chart showing an exemplary method 460 of scheduling transmission of a plurality of ATM cells at transmission rates corresponding to each of the ATM cells. The method begins at step 462 where controller 40 updates each of transmission memories 170 for ripeness. In this particular embodiment, ATM cells 314 stored in transmission memories 170 may be designated for transmission to communications link 18 only if the associated transmission memory 170 is "ripe" for transmission.

Whether a particular transmission memory 170 is ripe for transmission depends on whether the ATM cell 314 being considered for transmission from transmission memory 170 is the first ATM cell of a particular USB segment 210. Where ATM cell 314 is the first ATM cell to be transmitted from associated USB segment 210, transmission memory 170 may be determined to be ripe at any time chosen by controller 40.

As an example, when a transmission memory 170 is newly scheduled, controller 40 sets SCHED_TIME value 312 associated with that transmission memory equal to TX_CELL_TIME+1. As previously discussed, TX_CELL_TIME is a running count of cell transmission opportunities. Transmission memory 170 will be considered ripe when the SCHED_TIME value 312 associated with that transmission memory 170 is equal to the TX_CELL_TIME value 310. Setting SCHED_TIME value 312 to a value one greater than TX_CELL_TIME allows that transmission memory 170 to be ripe after the next cell transmission opportunity.

If, on the other hand, ATM cell 314 of transmission memory 170 is being considered for transmission following a transmission of a previous cell of the same USB segment 212, the associated transmission memory 170 will be considered ripe for transmission only after the passage of an inter-cell gap (optionally adjusted for transmission delay) associated with ATM cells of USB segment 210. For example, after one ATM cell 314 is transmitted, another cell from the same transmission memory may be rescheduled by setting SCHED_TIME 312 equal to the current value of TX_CELL_TIME plus an inter-cell gap associated with the current transmission rate. As will be discussed below, this inter-cell gap, or transmission rate, may be adjusted to compensate for transmission errors incurred during previous cell transmissions.

In the illustrated embodiment, designating a transmission memory 170 as ripe does not guarantee that cells will be designated for transmission on the next transmission opportunity. For example, multiple transmission memories 170 may be designated ripe at any given time, and transmission memories holding higher priority ATM cells will take precedence over those storing lower priority cells. For various reasons, ATM cells stored in transmission memories 170 may experience delay in transmission. It is desirable to keep track of this delay, to allow system 10 to compensate for the delay by, for example, altering transmission rates associated with ATM cells 314.

In the illustrated embodiment, system 10 tracks transmission delays using SCHED_TIME value 312. After a channel is designated as ripe, the value that was stored in SCHED_TIME register 312 is no longer needed. System 10 takes advantage of this fact to reuse the same memory space for stored transmission delay associated with the corresponding transmission memory 170. Each time ATM cells in a ripe transmission memory 170 miss a transmission opportunity, the value in SCHED_TIME register 312 is incremented by one. After a transmission memory 170 is ripe, controller 40 uses the value stored in SCHED_TIME register 312 to account for accumulated transmission error when it reschedules transmission of additional ATM cells associated with the same USB segment 210. Details regarding compensation for transmission error will be described in more detail below.

Referring again to FIG. 6C, after controller 40 has updated transmission memories 170 for ripeness at step 462, controller 40 identifies a first transmission memory at step 464. The first transmission memory is the transmission memory 170 that controller 40 will examine first. If that transmission memory 170 is scheduled and ripe, cells will be transmitted from that transmission memory. Controller 40 may determine which memory to examine first based on a number of factors. For example, the first transmission memory 170 may be determined in a round-robin fashion, by selecting the first transmission memory with reference to the last transmission memory 170 that was permitted to transmit a cell. As a further example, the first transmission memory 170 may be determined by examining PRIORITY VALUES 254 associated with a transmission rate 252 corresponding to each transmission memory 170. System 10 provides an advantage of allowing for rate control of ATM cells based on a transmission priority associated with the cells. The present invention provides an advantage of facilitating such rate control by performing the rate control algorithm at modem 16, rather than at host 12.

Controller 40 examines the transmission memory 170 designated as the first transmission memory at step 466, and determines whether that transmission memory has been scheduled at step 468. A transmission memory 170 is considered "scheduled," if it contains ATM cells 314 for transmission. In the illustrated embodiment, transmission manager 152 writes a "one" into a bit of TX_SCHEDULED register 330 corresponding to the transmission memory 170 receiving ATM cell 314. Controller 40 reads TX_SCHEDULED register 330 to determine whether the transmission memory 170 being examined is scheduled for transmission. If controller 40 determines at step 468 that transmission memory 170 is not scheduled for transmission, it determines whether there are additional transmission memories left to check at step 470, and proceeds to check at step 474 the next transmission memory 170 to determine if that transmission memory 170 is scheduled.

If controller 40 finds no transmission memories 170 that are scheduled, controller 40 instructs transmission manager 152 at step 472 to designate an idle cell for transmission at the next cell transmission opportunity. If, on the other hand, controller 40 identifies at step 468 a transmission memory that is scheduled, controller 40 proceeds by determining whether the schedule transmission memory is ripe at step 476. If the schedule transmission memory 170 is not ripe, controller 40 searches for another transmission memory 170 that is scheduled, and checks that transmission memory 170 for ripeness. If controller 40 is unable to find any transmission memories 170 that are both scheduled and ripe, it directs transmission manager 152 at step 472 to designate an idle cell for transmission at the next cell transmission opportunity.

If, on the other hand, controller 40 identifies a transmission memory 170 that is both scheduled and ripe, it directs transmission manager 152 at step 478 to transmit ATM cell 314 associated with that transmission memory 170 at the next cell transmission opportunity. In this particular embodiment, controller 40 writes an identifier associated with transmission memory 170 to KICK_CHANNEL field 350 of TX_KICK register 340. On the next cell transmission opportunity, transmission manager 152 reads the value from KICK_CHANNEL field 350 of TX_KICK register 340 to determine which ATM cell 314 should be transmitted.

After designating an ATM cell 314 for transmission at step 478, controller 40 checks whether there are additional ATM cells 314 associated with the same USB segment 210 stored in the same transmission memory 170 at step 480. If there are no additional cells from that USB segment 210 currently stored in transmission memory 170 and TX_END_FOUND flag 356 is set, controller 40 notifies host 12 at step 481 that the last cell from that segment has been transmitted. Controller 40 then updates all transmission memories 170 for ripeness and determines a new first transmission memory 170 to begin the scheduling process again. If, on the other hand, controller 40 finds additional cells in transmission memory 170, which are associated with the same USB segment 210, controller 40 reschedules transmission of the next ATM cell 314 in transmission memory 170 at step 482 using the rate control information received with the associated ATM cells.

FIG. 6D is a flow chart showing an exemplary method 482 of rescheduling transmission of a plurality of cells associated with a common USB segment 210. Once controller 40 determines that additional ATM cells 314 of USB segment 210 reside in transmission memory 170, controller 40 determines a specified transmission rate associated with the constructed ATM cells 314 in transmission memory 170. In the illustrated embodiment, Controller 40 reads TX_FLAG_FOUND field 346 of TX_KICK register 340. If TX_FLAG_FOUND field 346 is set to "1," control register knows to read RATE_OUT field 356 to obtain a new transmission rate associated with this ATM cell 314. If TX_FLAG_FOUND field is not set (e.g. ="0"), controller 40 uses a rate code associated with the last transmitted cell from that transmission memory 170.

In a particular embodiment, the value in RATE_OUT field 358 comprises an index to rate table 250. Rate table 250 comprises a plurality of entries 252, each entry 252 including an integer portion 256 and a fractional portion 258 of a particular transmission rate specified by host 12.

Controller 40 determines a transmission error associated with transmission memory 170 at step 486. In this embodiment, the transmission error comprises a delay in transmission caused by missed transmission opportunities. The transmission error is stored in SCHED_TIME register 312. As previously discussed, once a channel is designated as ripe, the SCHED_TIME register 312 is used to track the number of transmission opportunities that pass without a transmission from transmission memory 170. Controller 40 uses the transmission error to adjust the specified transmission rate at step 488, and thus compensates for delays caused by missed transmission opportunities.

In this particular embodiment, the specified transmission rate comes from the RATE_CODE 229 that was received in transmission encapsulation header 220 associated with this group of ATM cells 314. Controller 40 adjusts the specified transmission rate by first comparing the specified transmission rate (which is expressed in terms of an inter-cell gap) to the value of the transmission error stored in SCHED_TIME register 312. A transmission error that is greater than or equal to the specified transmission rate indicates that transmission memory 170 has experienced delay of at least one inter-cell gap. In that case, controller 40 reschedules the next ATM cell 314 of transmission memory 170 for immediate transmission. In other words, transmission memory 170 remains in a ripe state. In that case, controller 40 has compensated for transmission delay by eliminating one inter-cell gap in the transmission rate. Controller 40 adjusts the value of the transmission error to reflect this compensation.

If, on the other hand, the transmission error is less than the specified transmission rate, controller 40 sets the status of transmission memory 170 as not ripe. In this case, because the transmission error is less than the transmission rate, the transmission rate can be adjusted by the transmission error, leaving an inter-cell gap remaining until the next transmission opportunity. For example, if the specified transmission rate was an inter-cell gap of ten cell transmission opportunities, and the transmission error was seven missed cell transmission opportunities, the specified rate could be adjusted to make up the seven missed cell transmission opportunities, leaving a specified transmission rate of three cell transmission opportunities.

System 10 provides rate control at modem 16 through several mechanisms. In one aspect of operation, modem 16 controls the rate of transmission of ATM cells for modem memory 16 by rescheduling transmission of each cell based on a transmission rate associated with particular USB segment 210 with which that cell is associated. In another aspect of operation, modem 16 affects rate control over signals transmitted to communications link 18 by compensating for delay incurred due to missed cell transmission opportunities. In still another aspect of operation, modem 16 provides rate control by accounting for relative transmission priorities associated with various groups of ATM cells.

By performing scheduling and rate control algorithms at modem 16, rather than at host 12, system 10 reduces processing burden on host 12, and provides more accurate control over the transmission of ATM cells to communications link 18. In addition, system 10 provides an advantage of transmitting rate control information associated with each group of ATM cells in an encapsulation header transmitted with the cells over universal serial bus 14. This provides an effective way of associating each ATM cell or group of ATM cells with, for example, a particular transmission rate, while avoiding the need to use a complex control structure at modem 16 to store and manage a large amount of rate control information.

Figure 7:
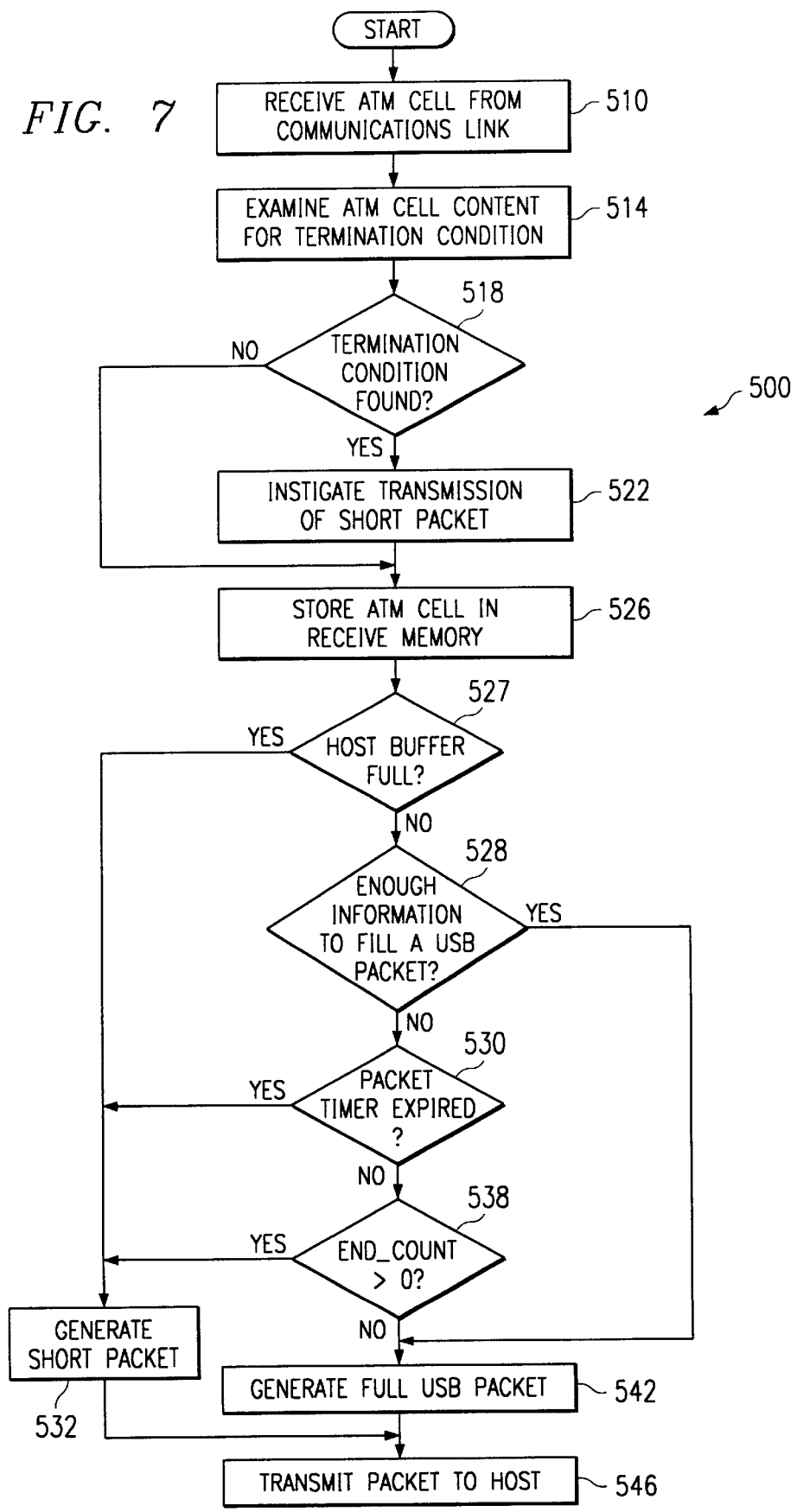
FIG. 7 is a flow chart showing an exemplary method of communicating information from a communications link to a host using a universal serial bus.

FIG. 7 is a flow chart showing an exemplary method of communicating information from communications link 18 to host 12 using universal serial bus 14. The method 500 begins at step 510 where communications manager 50 receives ATM cell 272 from communications link 18. Communications manager 50 examines the content of ATM cell 272 at step 514 to determine whether ATM cell 272 contains a termination condition. For example, communications manager 50 may examine ATM header information 274 to determine whether ATM cell 272 is the last cell of a particular protocol data unit, as indicated by an AAL5 "last-cell" indicator bit. As another example, communications manager 50 may examine ATM header information 274 for a payload type indicator (PTI) bit, indicating that ATM cell 274 is a resource management (RM) cell or an operations, administration, and maintenance (OAM) cell. Resource management cells typically contain information, such as, network bandwidth available, congestion or impending congestion conditions, or other network management information. Similarly, operations, administration, and maintenance cells typically contain network fault indicators, performance information, and other data diagnosis information. These types of information are valuable to host 12, making it desirable to pass this information to host 12 as quickly as possible. System 10 facilitates swift transmission of these types of information to driver 32 of host 12 by making them termination conditions, which invoke short packeting functionality.

If communications manager 50 identifies a termination condition associated with the content of ATM cells 272, at step 518, it proceeds by instigating transmission of a short packet at step 522. In the illustrated embodiment, where communications manager 50 identifies a termination condition associated with the content of ATM cell 272, it instigates transmission of a short packet by incrementing the value of END_COUNT register 364.

Communications manager 50 next stores ATM cell 272 in receive memory 172 at step 526. In this embodiment, receive memory 172 comprises a single first-in-first-out memory structure. Using a single memory structure to store all ATM cells received from communications link 18 provides an advantage of saving significant memory in modem 16, especially compared to conventional systems using separate memory structures for each protocol data unit received from each virtual channel. Communications manager continuously receives ATM cells 272, checks for termination conditions, and stores ATM cells 272 in receive memory 172.

Communications manager continues by checking at step 527 whether the current host buffer stored in receive memory 34 is full or near full. In this embodiment, communications manager 50 keeps track of the number of cells transmitted to the current host buffer. By comparing that figure with value in NUM_CELLS register 360, communications manager 50 can determine which ATM cell 272 will, when transmitted to the current host buffer, fill that buffer. Upon recognizing that transmission of a particular ATM cell 272 will fill the current host buffer, communications manager generates a short packet including that ATM cell 272 at step 532.

When ATM cells 272 reside in receive memory 172, communications manager generates USB packets 278 for transmission to host 12. In particular, communications manager checks at step 528 whether receive memory 172 contains enough information to fill one of USB packets 278. If receive memory 172 contains enough information to fill an entire USB packet 278, communications manager generates a full USB packet 278 at step 542.

Communications manager 50 checks to see whether a packet timer has exceeded the value specified in PKT_TIME register 362 at step 530. A packet timer is started when the first USB packet 278 is transmitted to a new host buffer in receive memory 34, and is incremented periodically. If communications manager 50 determines at step 530 that the packet timer has met or exceeded the value in PKT_TIME register 362, communications manager 50 generates a short packet at step 532.

If the packet timer has not exceeded the specified PKT_TIME 362 and the current host buffer is not full or near full, communications manager 50 continues by checking whether END_COUNT register 364 contains a non-zero entry at step 538. If the value in END_COUNT register 364 is not zero, communications manager 50 generates a short packet at step 532. The short packet generated in response to a termination condition associated with the contents of ATM cell 272 may or may not include ATM cell 272. In the illustrated embodiment, communications manager will not terminate a host buffer if ATM cells remain in receive memory 172. If ATM cells reside in receive memory 172, and a termination condition associated with the content of an ATM cell 272 is identified, communications manager will transmit all cells currently in receive memory 172 in a series of USB packets 178 at step 546, finishing with a short packet. In this way, system 10 ensures that host 12 receives an entire protocol data unit of ATM cells 272, even where the termination condition is associated with an ATM cell 272 other than the final cell in the protocol data unit.

If communications manager 50 stores enough ATM cells 272 in receive memory 172 to form a full USB packet 278, and no termination conditions have been observed, communications manger 50 generates a full USB packet at step 542 and transmits it to the current host buffer at step 546.

Although the steps of method 500 have been described in a particular order, the invention is not so limited. For example, the order of steps 527 through 538 could be rearranged without departing from the scope of the invention.

The present invention provides significant advantages in communicating information from communications link 18 to host 12. By storing all ATM cells received from communications link 18 in a single memory structure, system 10 minimizes the memory required in modem 16. In addition, by transmitting ATM cells to host 12 as soon as modem 16 receives enough information to fill a USB packet 278, system 10 reduces latency in transmission. Furthermore, by dynamically determining when to short packet a host buffer using termination conditions associated with the content of ATM cells 252 received, the present invention facilitates efficient communication of information, while minimizing the processing load on host 12.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A system for communicating information between a host and a communications link using a universal serial bus, comprising:

a driver at the host operable to receive a data block comprising a plurality of ATM cell payloads, to format the data block into a first USB segment including rate control information associated with the plurality of ATM payloads, and to communicate the first USB segment to the universal serial bus; and a modem operable to receive the first USB segment comprising the plurality of ATM cell payloads from the universal serial bus, to store the ATM cell payloads in a modem memory, and to schedule transmission of the ATM cell payloads at a particular transmission rate using the rate control information received in the USB segment.

2. The system of claim 1, wherein the USB segment comprises a plurality of packets, each packet comprising at least one of the ATM cell payloads, and at least one of the packets comprising ATM cell header information associated with the ATM cell payloads.

3. The system of claim 1, wherein the USB segment comprises a plurality of packets, each packet comprising at least one of the ATM cell payloads, and only one of the packets comprising ATM cell header information associated with the ATM cell payloads.

4. The system of claim 1, wherein the USB segment comprises a transmission encapsulation header comprising:

ATM cell header information associated with the plurality of ATM cell payloads; and the rate control information associated with the plurality of ATM cell payloads.

5. The system of claim 4, wherein the ATM cell payloads are concatenated together and appended to the transmission encapsulation header.

6. The system of claim 1, wherein the modem memory comprises a plurality of transmission memories each corresponding to an endpoint of the universal serial bus, and wherein the modem comprises a communications manager operable to receive the plurality of ATM cell payloads, and to store each of the plurality of ATM cell payloads in a transmission memory corresponding to a universal serial bus endpoint on which the plurality of ATM cell payloads were received.

7. A modem operable to facilitate communication between a host and a communications link, the modem comprising:

a modem memory operable to store a rate control algorithm; and a controller operable to receive from a universal serial bus a first USB segment comprising a first plurality of ATM cells and rate control information associated with the first plurality of ATM cells, to store the first plurality of ATM cells in the memory, to perform the rate control algorithm on the first plurality of ATM cells using the rate control information received in the first USB segment, and to transmit each of the plurality of ATM cells at a particular transmission rate according to the results of the rate control algorithm.

8. The modem of claim 7, wherein the modem memory comprises a plurality of transmission memories each corresponding to an endpoint of the universal serial bus, and further comprising a communications manager operable to receive the first plurality of ATM cells from the controller, and to store each of the first plurality of ATM cells in the transmission memory corresponding to a universal serial bus endpoint on which the first plurality of ATM cells were received.

9. The modem of claim 8, wherein the controller comprises a scheduler operable to determine a transmission order among the plurality of transmission memories.

10. The modem of claim 8, wherein the controller comprises a scheduler operable to identify all transmission memories that are currently storing ATM cells, and for each transmission memory currently storing ATM cells, to check the transmission memory for ripeness by determining whether a specified inter-cell gap has elapsed since a previous transmission from that transmission memory, the scheduler further operable to instigate a transmission of an ATM cell from a ripe transmission memory.

11. The modem of claim 7, wherein the rate control information comprises a transmission rate associated with the first plurality of ATM cells.

12. The modem of claim 7, wherein:

the first USB segment comprises a first transmission rate associated with the first plurality of ATM cells; and the controller is further operable to receive from the universal serial bus a second USB segment comprising a second plurality of ATM cells and a second transmission rate associated with the second plurality of ATM cells, to schedule transmission of the first and second pluralities of ATM cells, and to transmit each of the ATM cells to the communications link at approximately its associated transmission rate.

13. The modem of claim 7, wherein the first USB segment comprises at least one USB packet, each USB packet comprising at least one ATM cell payload, only one of the USB packets including ATM cell header information and rate control information, the ATM cell header information and rate control information associated with all of the ATM cell payloads.

14. The modem of claim 13, wherein the controller comprises a de-encapsulator operable to extract the ATM cell header information and the ATM cell payloads from the USB packets.

15. The modem of 14, further comprising a communications manager operable to receive from the encapsulator a copy of the ATM cell header information and the plurality of ATM cell payloads, the communications manager further operable to format ATM cells by associating each ATM cell payload with a copy of the ATM cell header information.

16. The modem of claim 7, wherein each ATM cell comprises a rate code identifying a transmission rate associated with the ATM cell, and wherein the rate code comprises an index to a rate table comprising a plurality of entries, each entry corresponding to a particular transmission rate.

17. The modem of claim 16, wherein each entry in the rate table comprises:

an integer field specifying an integer portion of the transmission rate; and a fractional field specifying a fractional portion of the transmission rate.

18. A modem operable to facilitate communication between a host and a communications link, the modem comprising:

a modem memory operable to store a rate control algorithm; and a controller operable to receive from a universal serial bus a USB segment comprising a plurality of ATM cells and a specified transmission rate associated with the plurality of ATM cells, the controller further operable to perform the rate control algorithm following a transmission of at least one of the plurality of ATM cells to identify an amount of transmission delay and determine an adjusted transmission rate by adjusting the specified transmission rate based at least partially on the identified transmission delay, the controller still further operable to transmit another one of the plurality of ATM cells at the adjusted transmission rate.

19. A system for communicating information between a host and a communications link, comprising:

a host operable to generate a first USB segment comprising a first plurality of ATM cells associated with a first transmission channel and a second USB segment comprising a second plurality of ATM cells associated with a second transmission channel, the host further operable to transmit the first USB segment in a first burst communication and the second USB segment in a second burst communication;

a universal serial bus operable to receive the first USB segment in the first burst communication from the host, and the second USB segment in the second burst communication from the host;

a modem operable to receive the first and second USB segments from the universal serial bus, and to transmit the first plurality of ATM cells to the communications link at a first transmission rate and the second plurality of ATM cells to the communications link at a second transmission rate.

20. A method of communicating information between a host and a communications link using a universal serial bus, the method comprising:

receiving at a host, a data block comprising a plurality of ATM cell payloads formatting the data block at the host into a USB segment including rate control information associated with the plurality of ATM payloads communicating the USB segment over the universal serial bus;

receiving at a modem the USB segment from the universal serial bus;

storing the ATM cell payloads in a modem memory; and scheduling transmission of the ATM cell payloads at a particular transmission rate using the rate control information.

21. The method of claim 20, wherein the USB segment comprises a plurality of packets, each packet comprising at least one of the ATM cell payloads, and at least one of the packets comprising ATM cell header information associated with the ATM cell payloads.

22. The method of claim 20, wherein the USB segment comprises a plurality of packets, each packet comprising at least one of the ATM cell payloads, and only one of the packets comprising ATM cell header information associated with the ATM cell payloads.

23. The method of claim 20, wherein the USB segment comprises a transmission encapsulation header comprising:

ATM cell header information associated with the plurality of ATM cell payloads; and the rate control information associated with the plurality of ATM cell payloads.

24. The method of claim 23, wherein the ATM cell payloads are concatenated together and appended to the transmission encapsulation header.

25. The method of claim 20, wherein the modem memory comprises a plurality of transmission memories, each associated with a particular USB endpoint, and wherein storing the plurality of ATM cell payloads comprises:

identifying a USB endpoint on which the USB segment was received; and identifying the transmission memory associated with the USB endpoint on which the USB segment was received; and storing the plurality of USB segments in the identified transmission memory.

26. A method of communicating information between a host and a communications link using a universal serial bus and a modem, the method comprising:

receiving from the universal serial bus a first USB segment comprising a first plurality of ATM cells and a transmission rate associated with the first plurality of ATM cells, and a second USB segment comprising a second plurality of ATM cells and a second transmission rate associated with a second plurality of ATM cells;

storing the first and second pluralities of ATM cells in a memory;

scheduling at the modem transmission of the first plurality of ATM cells at the first transmission rate;

scheduling at the modem transmission of the second plurality of ATM cells at the second transmission rate; and transmitting to the communications link the first plurality of ATM cells at approximately the first transmission rate and the second plurality of ATM cells at approximately the second transmission rate.

27. The method of claim 26, wherein each of the first and second USB segments comprises:

plurality of packets each comprising at least one ATM cell payload, only one of the plurality of packets including ATM cell header information associated with the at least one ATM cell payload; and wherein receiving the first and second pluralities of ATM cells comprises associating each ATM cell payload with a copy of the ATM cell header information.

28. The method of claim 26, wherein storing the first and second pluralities of ATM cells comprises:

storing the first plurality of ATM cells in a first transmission memory associated with a USB endpoint on which the first USB segment was received; and storing the second plurality of ATM cells in a second transmission memory associated with a second USB endpoint on which the second USB segment was received.

29. The method of claim 26, wherein the first plurality of ATM cells comprises a transmission rate field specifying the transmission rate associated with each of the first plurality of ATM cells, and wherein transmitting the first plurality of ATM cells at the first transmission rate comprises:

for each of the first plurality of ATM cells, accessing the associated transmission rate field to determine the first transmission rate;

comparing the first transmission rate to a current transmission rate;

if the first transmission rate differs from the current transmission rate, changing the current transmission rate to the first transmission rate; and transmitting the ATM cell at the first transmission rate.

30. The method of claim 29, wherein the second plurality of ATM cells comprises a transmission rate field specifying the transmission rate associated with each of the second plurality of ATM cells, and wherein transmitting the second plurality of ATM cells at the second transmission rate comprises:

for each of the second plurality of ATM cells, accessing the associated transmission rate field to determine the second transmission rate;

comparing the second transmission rate to the current transmission rate;

if the second transmission rate differs from the current transmission rate, changing the current transmission rate to the second transmission rate; and transmitting the ATM cell at the second transmission rate.

31. The method of claim 26, wherein each of the first plurality of ATM cells specifies a rate code, and wherein scheduling transmission of the first plurality of ATM cells comprises:

for each of the first plurality of ATM cells, accessing the associated rate code;

using the rate code to access a rate table comprising a plurality of transmission rates indexed, each indexed by a unique rate code;

identifying the first transmission rate as a transmission rate in the rate table corresponding to the rate code.

32. The method of claim 31, wherein each entry in the rate table comprises:

an integer portion specifying an integer number of cell times; and a fractional portion specifying a fraction of a cell time.

33. The method of claim 31, wherein the each entry in the rate table comprises a transmission priority value operable to specify a transmission priority of the associated ATM cell relative to other ATM cells.

34. A method of communicating information between a host and a communications link using a universal serial bus and a modem, the method comprising:

receiving at the modem a USB segment comprising a plurality of ATM cells and a specified transmission rate associated with the plurality of ATM cells;

transmitting at least one of the plurality of ATM cells;

identifying an amount of transmission delay associated with the transmission of the at least one of the plurality of ATM cells;

adjusting the specified transmission rate based at least partially on the identified transmission delay to determine an adjusted transmission rate; and transmitting at least one of the plurality of ATM cells at the adjusted transmission rate.

35. The method of claim 34, wherein receiving a plurality of ATM cells comprises:

receiving a plurality of packets associated with a single transmission channel, each packet comprising at least one ATM cell payload, only one of the plurality of packets including ATM cell header information, the ATM cell header information associated with all of the ATM cell payloads; and for each packet, associating each ATM cell payload with a copy of the ATM cell header information.

36. The method of claim 34, wherein receiving a plurality of ATM cells comprises:

receiving a plurality of segments associated with a single transmission channel, each segment including at least one ATM cell payload and ATM cell header information associated with the at least one ATM cell payload; and for each segment, associating each ATM cell payload with the associated ATM cell header information.

37. The method of claim 36, further comprising:

storing all ATM cells associated with a first segment in a first transmission memory; and storing all ATM cells associated with a second segment in a second transmission memory.

38. A method of communicating information between a host and a communications link using a universal serial bus and a modem, the method comprising:

receiving from the universal serial bus a first plurality of ATM cells associated with a first transmission channel of the communications link;

receiving from the universal serial bus a second plurality of ATM cells associated with a second transmission channel of the communications link;

storing the first plurality of ATM cells in a first transmission memory;

storing the second plurality of ATM cells in a second transmission memory; and determining at the modem a transmission order for the cells of the first and second pluralities of ATM cells.

39. The method of claim 38, wherein receiving the first plurality of ATM cells comprises:

receiving a plurality of packets associated with a single transmission channel, each packet comprising at least one ATM cell payload, only one of the plurality of packets including ATM cell header information, the ATM cell header information associated with all of the ATM cell payloads; and for each packet, associating each ATM cell payload with a copy of the ATM cell header information.

40. The method of claim 39, wherein the plurality of packets comprise:

a first packet comprising the ATM cell header information and an ATM cell payload; and a second packet comprising concatenated ATM cell payloads.

41. The method of claim 38, wherein storing the first and second pluralities of ATM cells comprises:

storing the first plurality of ATM cells in a first transmission memory associated with the first transmission channel; and storing the second plurality of ATM cells in a second transmission memory associated with the second transmission channel.

42. The method of claim 38, wherein determining at the modem a transmission order comprises:

identifying all transmission memories that are currently storing ATM cells;

for each transmission memory currently storing ATM cells, determining whether a specified time has elapsed since the last cell was transmitted on the associated transmission channel; and for each transmission channel for which the specified time has elapsed, designating that transmission memory as ripe.

43. The method of claim 42, further comprising:

identifying all ripe transmission memories;

determining a transmission priority associated with ATM cells in each ripe transmission memory; and determining an ATM cell for transmission based on the relative transmission priorities associated with the ATM cells in each ripe transmission memory.

44. The method of claim 42, further comprising:

transmitting an ATM cell from a ripe transmission memory to the communications link; and rescheduling transmission of another ATM cell from the ripe transmission memory for transmission at a later time.

45. The method of claim 38, further comprising:

identifying a last ATM cell associated with the first transmission channel; and notifying the host when the last ATM cell associated with the first transmission channel is removed from the first transmission memory.

46. A method of communicating information from a host to a communications link using a universal serial bus, the method comprising:

receiving a universal serial bus segment comprising:

a transmission encapsulation header including ATM cell header information and rate control information; and a plurality of concatenated ATM cell payloads appended to the transmission encapsulation header;

associating each ATM cell payload with a copy of the ATM cell header information to form ATM cells;

performing a rate control algorithm using the rate control information in the transmission encapsulation header; and transmitting the ATM cells to the communications link.

47. The method of claim 46, wherein the segment comprises:

a first packet comprising the transmission encapsulation header, a first ATM cell payload, and a portion of a second ATM cell payload concatenated with the first ATM cell payload; and a second packet comprising a remaining portion of the second ATM cell payload, and at least a portion of a third ATM cell payload concatenated with the remaining portion of the second ATM cell payload.

48. The method of claim 46, wherein the transmission encapsulation header includes a rate field specifying a transmission rate associated with the ATM cells.

49. The method of claim 48, wherein the rate field comprises a rate code comprising an index to a table of transmission rates, and wherein transmitting the ATM cells to the communications link comprises:

using the rate code to access the rate table;

identifying a transmission rate associated with the ATM cell as a transmission rate in the rate table corresponding to the rate code.

50. The method of claim 49, wherein each entry in the rate table comprises:

an integer portion specifying an integer number of cell times; and a fractional portion specifying a fraction of a cell time.

51. The method of claim 49, wherein the each entry in the rate table comprises a transmission priority value operable to specify a transmission priority of the associated ATM cell.

* * * * *